(12) United States Patent
Ould-Ahmed-Vall

(10) Patent No.: US 10,929,129 B2
(45) Date of Patent: Feb. 23, 2021

(54) APPARATUS AND METHOD FOR MODIFYING ADDRESSES, DATA, OR PROGRAM CODE ASSOCIATED WITH OFFLOADED INSTRUCTIONS

(71) Applicant: Intel Corporation, Santa Clara, CA (US)

(72) Inventor: ElMoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/458,040

(22) Filed: Jun. 29, 2019

(65) Prior Publication Data

US 2020/0409697 A1    Dec. 31, 2020

(51) Int. Cl.
*G06F 9/30*  (2018.01)
*G06F 13/40*  (2006.01)

(52) U.S. Cl.
CPC .......... *G06F 9/3005* (2013.01); *G06F 9/3017* (2013.01); *G06F 9/30145* (2013.01); *G06F 13/4027* (2013.01)

(58) Field of Classification Search
None
See application file for complete search history.

(56) References Cited

U.S. PATENT DOCUMENTS

| | | | |
|---|---|---|---|
| 5,095,526 A | 3/1992 | Baum | |
| 5,497,497 A | 3/1996 | Miller et al. | |
| 5,752,071 A | 5/1998 | Tubbs et al. | |
| 5,828,875 A * | 10/1998 | Halvarsson | G06F 9/30145 712/241 |
| 6,247,109 B1 | 6/2001 | Kleinsorge et al. | |
| 7,395,410 B2 * | 7/2008 | Maeda | G06F 9/3885 712/225 |

(Continued)

FOREIGN PATENT DOCUMENTS

WO     2018/125250 A1     7/2018

OTHER PUBLICATIONS

'A Modern Multi-Core Processor—Lecture 2' from Parallel Computer Architecture and Programming CMU 15-418/15-618, Spring 2016. (Year: 2016).*

(Continued)

*Primary Examiner* — Steven G Snyder
(74) *Attorney, Agent, or Firm* — Nicholson De Vos Webster & Elliott LLP

(57) ABSTRACT

Apparatus and method for Modifying Addresses, Data, or Program Code Associated With Offloaded Instructions. One embodiment of a processor comprises: a plurality of cores; an interconnect coupling the plurality of cores; and offload circuitry to transfer work from a first core of the plurality of cores to a second core of the plurality of cores without operating system (OS) intervention, the work comprising a plurality of instructions; the second core comprising a translator to translate information associated with a first instruction of the plurality of instructions from a first format usable on the first core to a second format usable on the second core; fetch, decode, and execution circuitry of the second core to fetch, decode, and/or execute the first instruction using the second format.

21 Claims, 30 Drawing Sheets

(56) References Cited

U.S. PATENT DOCUMENTS

| | | | |
|---|---|---|---|
| 7,873,814 B1* | 1/2011 | Cohen | G06F 9/4552 |
| | | | 712/209 |
| 8,161,482 B1 | 4/2012 | Sakarda | |
| 8,438,306 B2* | 5/2013 | De Lescure | G06F 15/16 |
| | | | 709/238 |
| 8,930,722 B2* | 1/2015 | Sprangle | G06F 12/0875 |
| | | | 713/300 |
| 9,111,051 B2* | 8/2015 | Hanyu | G06F 13/4027 |
| 9,483,318 B2* | 11/2016 | Vajapeyam | G06F 9/5066 |
| 9,720,730 B2* | 8/2017 | Ginzburg | G06F 9/30101 |
| 9,829,965 B2* | 11/2017 | Hum | G06F 1/3293 |
| 10,310,897 B2* | 6/2019 | Drysdale | G06F 9/5038 |
| 10,552,207 B2* | 2/2020 | Tamir | G06F 9/4856 |
| 10,684,984 B2* | 6/2020 | Tamir | G06F 8/54 |
| 2002/0198769 A1 | 12/2002 | Ratcliff | |
| 2004/0012596 A1* | 1/2004 | Allen | G06T 15/005 |
| | | | 345/501 |
| 2006/0010305 A1* | 1/2006 | Maeda | G06F 9/3885 |
| | | | 712/34 |
| 2006/0218556 A1 | 9/2006 | Nemirovsky et al. | |
| 2010/0005474 A1* | 1/2010 | Sprangle | G06F 1/3206 |
| | | | 718/104 |
| 2011/0088041 A1 | 4/2011 | Alameldeen et al. | |
| 2011/0320766 A1 | 12/2011 | Wu et al. | |
| 2012/0110106 A1* | 5/2012 | De Lescure | G06F 15/7825 |
| | | | 709/211 |
| 2012/0260065 A1 | 10/2012 | Henry et al. | |
| 2013/0073771 A1* | 3/2013 | Hanyu | H04L 12/6418 |
| | | | 710/305 |
| 2013/0191612 A1 | 7/2013 | Li et al. | |
| 2013/0268943 A1* | 10/2013 | Solihin | G06F 9/5011 |
| | | | 718/104 |
| 2014/0082630 A1* | 3/2014 | Ginzburg | G06F 9/4881 |
| | | | 718/105 |
| 2014/0165074 A1 | 6/2014 | Hrischuk et al. | |
| 2014/0189332 A1 | 7/2014 | Ben-Kiki et al. | |
| 2014/0304490 A1 | 10/2014 | Toyama et al. | |
| 2015/0007196 A1* | 1/2015 | Toll | G06F 9/5083 |
| | | | 718/105 |
| 2015/0058650 A1 | 2/2015 | Varma et al. | |
| 2015/0212892 A1 | 7/2015 | Li et al. | |
| 2015/0220369 A1* | 8/2015 | Vajapeyam | G06F 9/4843 |
| | | | 718/105 |
| 2016/0170849 A1 | 6/2016 | Cheng et al. | |
| 2016/0378715 A1 | 12/2016 | Kang et al. | |
| 2017/0083364 A1 | 3/2017 | Zhao et al. | |
| 2017/0177415 A1 | 6/2017 | Dhanraj et al. | |
| 2017/0185449 A1* | 6/2017 | Zhang | G06F 9/5027 |
| 2017/0262281 A1 | 9/2017 | Bishop et al. | |
| 2017/0286122 A1 | 10/2017 | Wu et al. | |
| 2017/0364421 A1* | 12/2017 | Dusanapudi | G06F 9/46 |
| 2018/0089099 A1 | 3/2018 | Raj et al. | |
| 2018/0095750 A1* | 4/2018 | Drysdale | G06F 9/5038 |
| 2018/0095753 A1* | 4/2018 | Bai | G06F 9/3017 |
| 2018/0113797 A1 | 4/2018 | Breslow et al. | |
| 2018/0173529 A1* | 6/2018 | Tamir | G06F 9/4856 |
| 2018/0173530 A1* | 6/2018 | Tamir | G06F 9/48 |
| 2018/0173674 A1* | 6/2018 | Tamir | G06F 9/46 |
| 2018/0365022 A1 | 12/2018 | Varma et al. | |
| 2019/0163650 A1 | 5/2019 | Kim et al. | |

OTHER PUBLICATIONS

'Optimization of the Load Balancing Policy for Tiled Many-Core Processors' by Ye Liu et al., Dec. 6, 2018. (Year: 2018).*

'A High Performance Load Balance Strategy for Real-Time Multicore Systems' by Keng-Mao Cho et al., Hindawi Publishing Corporation, The Scientific World Journal, vol. 2014. (Year: 2014).*

'Saving Energy by Means of Dynamic Load Management in Embedded Multicore Systems' by Matthias Becker et al., Proceedings of the 9th IEEE International Symposium on Industrial Embedded Systems (SIES 2014), Pisa, 2014. (Year: 2014).*

European Search Report and Search Opinion, EP App. No. 20164747.6, dated Sep. 10, 2020, 10 pages.

Intel Corporation, "Intel 64 and IA-32 Architectures Software Developer's Manual (Combined vols. 1, 2A, 2B, 2C, 3A, 3B, and 3C)", Sep. 2014, 3439 pages.

Intel Corporation, "Intel Architecture Instruction Set Extensions Programming Reference", dated Feb. 2016, 1180 pages.

Kurose et al., "Asynchronous Migration for Parallel Genetic Programming on a Computer Cluster With Multi-core Processors" 16th International Symposium on Artificial Life and Robotics, Oita, Japan, Jan. 27-29, 2011, pp. 533-536.

Non-Final Office Action, U.S. Appl. No. 16/457,970, dated Jul. 28, 2020, 8 pages.

Non-Final Office Action, U.S. Appl. No. 16/458,035, dated Sep. 16, 2020, 8 pages.

Non-Final Office Action, U.S. Appl. No. 16/458,038, dated Jul. 8, 2020, 16 pages.

Non-Final Office Action, U.S. Appl. No. 16/458,046, dated Sep. 25, 2020, 28 pages.

European Search Report and Search Opinion, EP App. No. 20165090.0, dated Oct. 12, 2020, 11 pages.

* cited by examiner

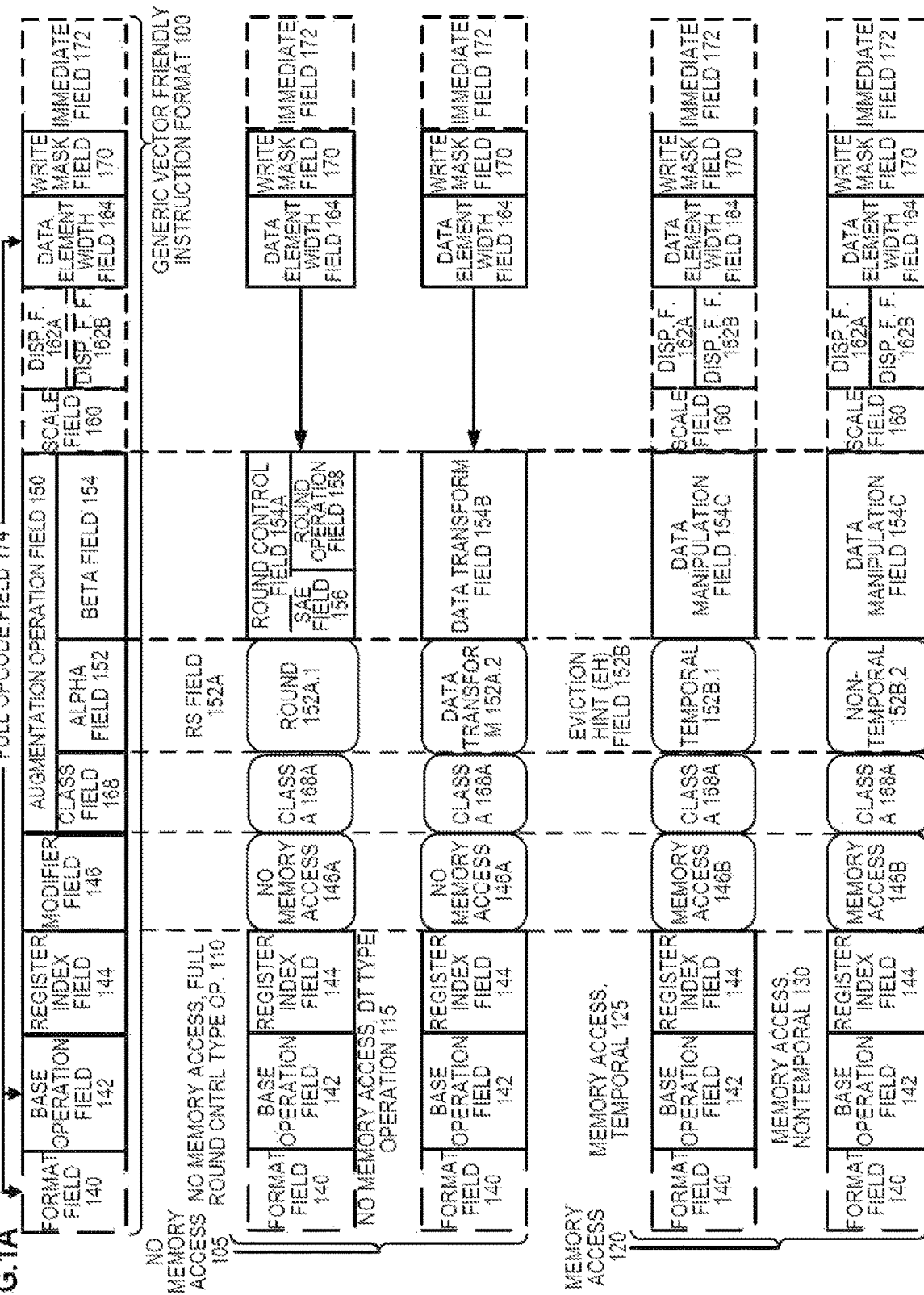

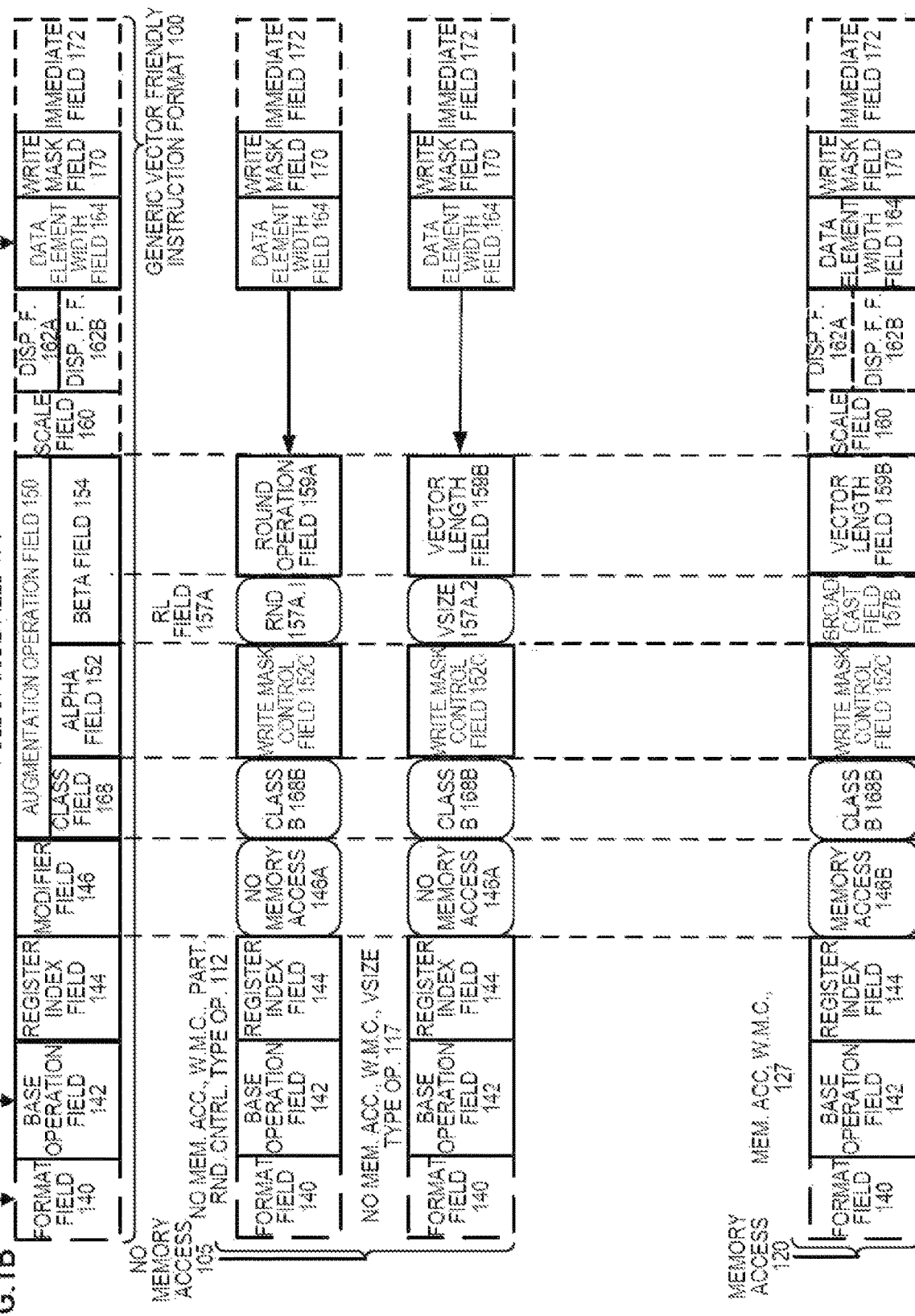

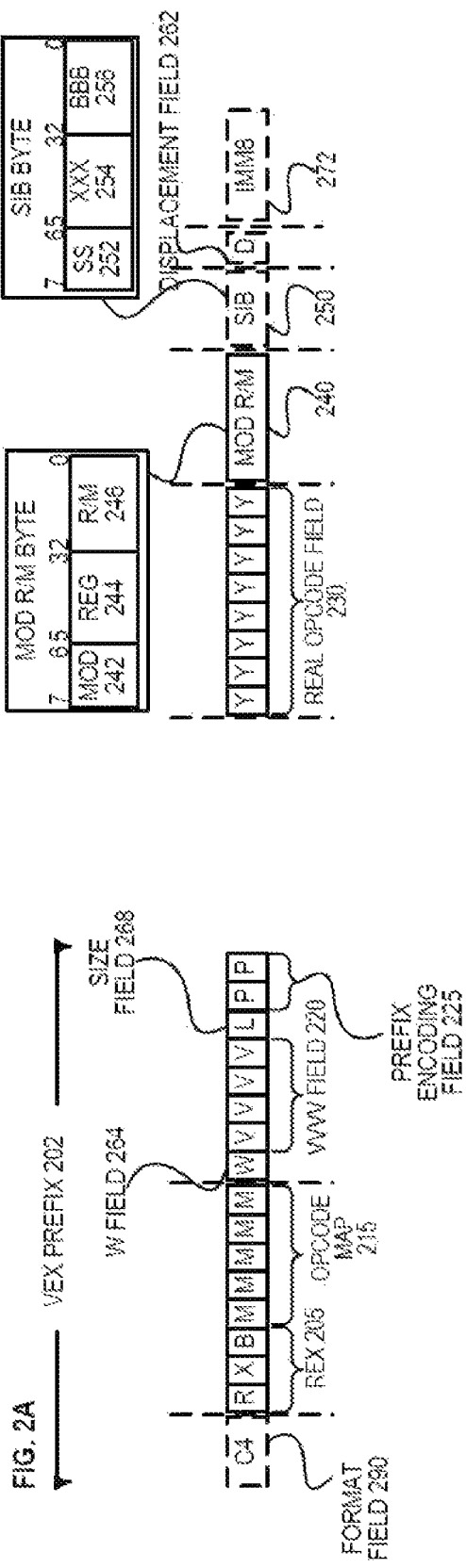
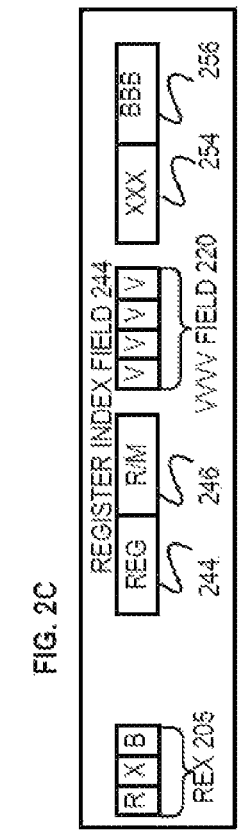
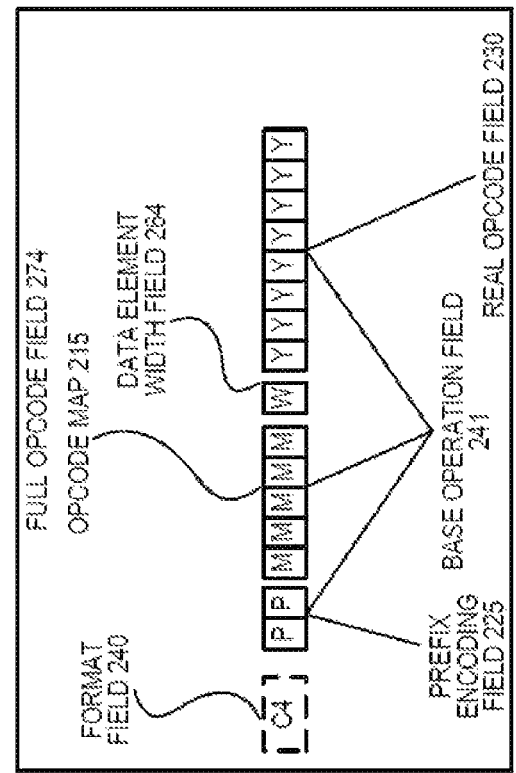
FIG. 2A
FIG. 2B
FIG. 2C

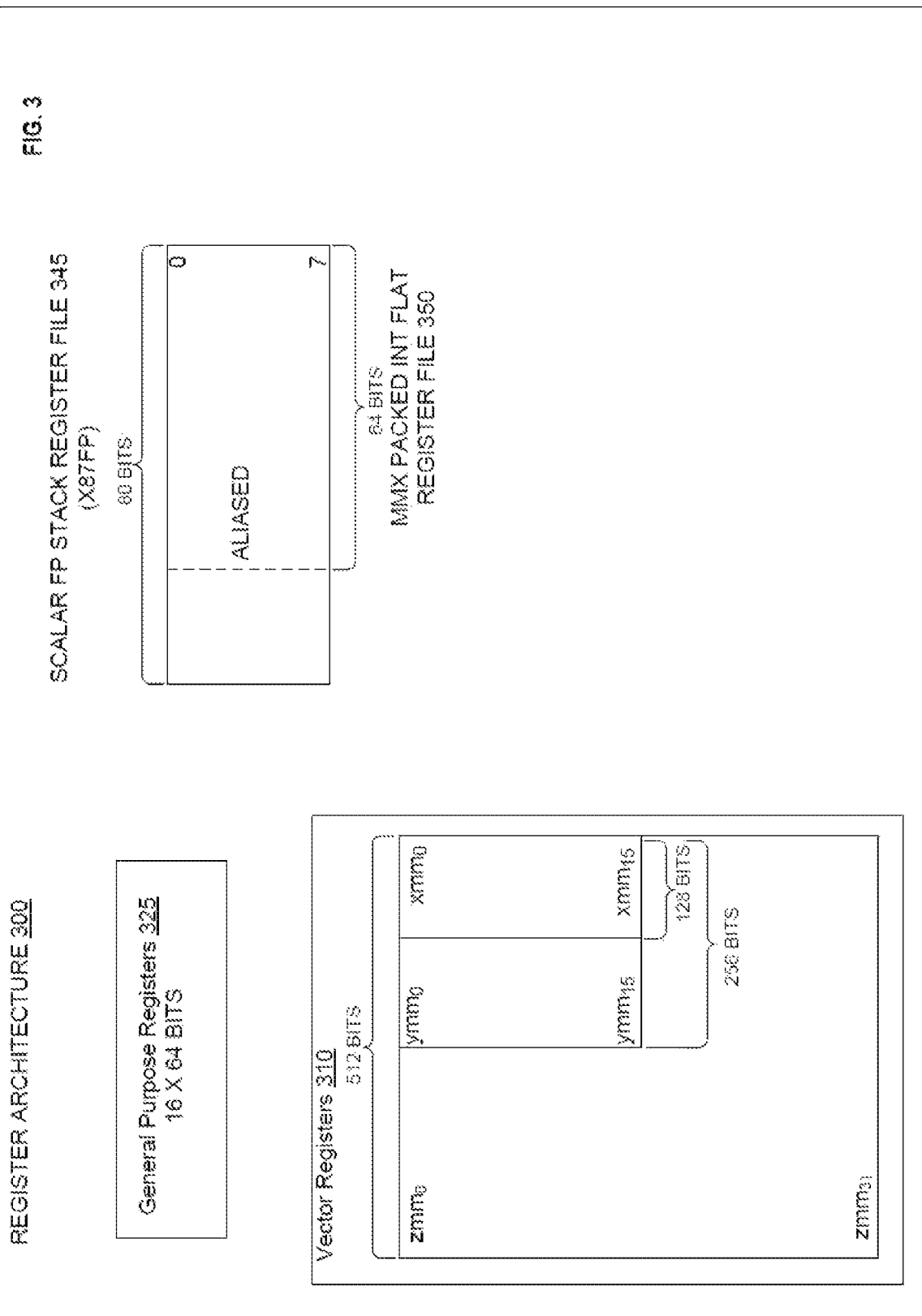

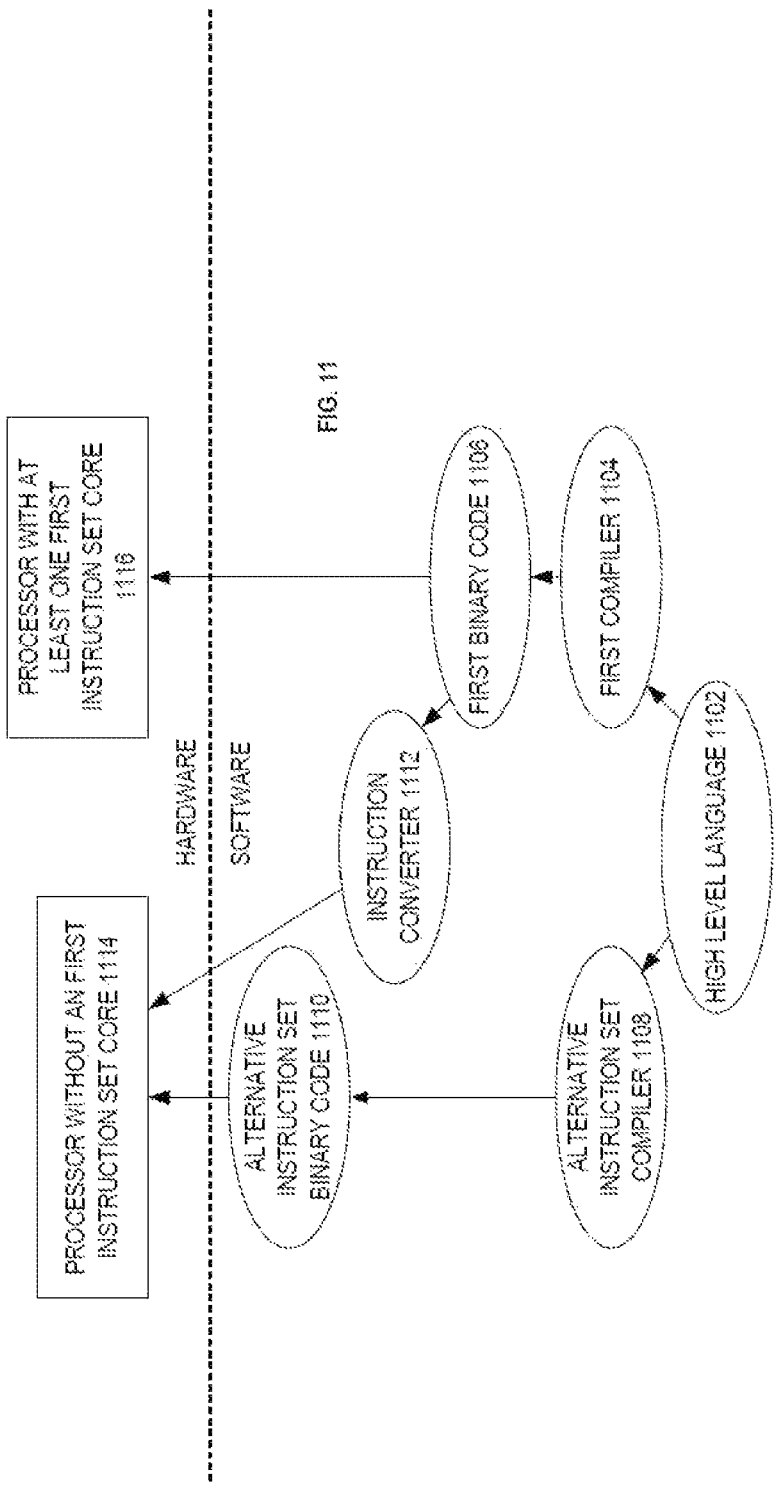

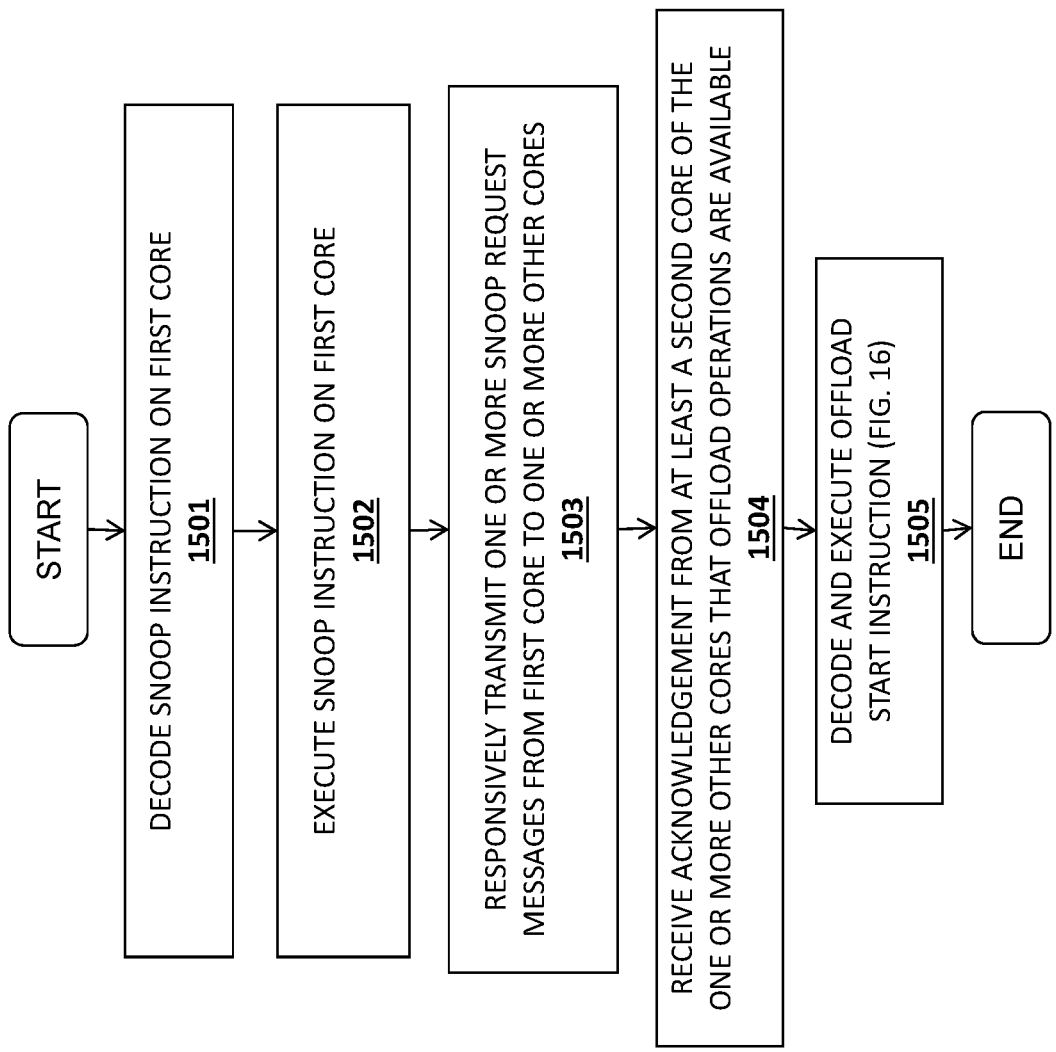

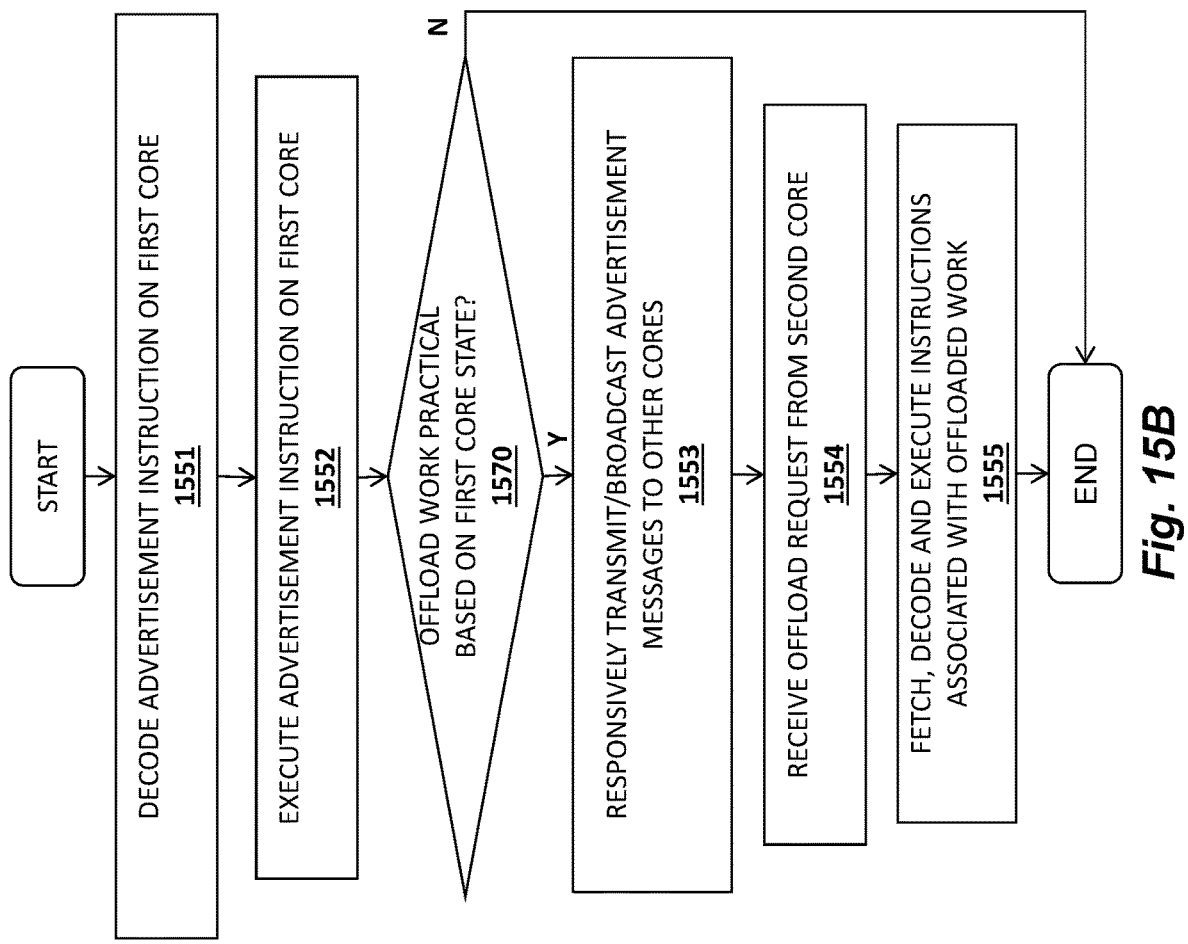

APPARATUS AND METHOD FOR MODIFYING ADDRESSES, DATA, OR PROGRAM CODE ASSOCIATED WITH OFFLOADED INSTRUCTIONS

BACKGROUND

Field of the Invention

This invention relates generally to the field of computer processors and software. More particularly, the invention relates to a method and apparatus for offloading work between processing units, including homogeneous processing units and heterogenous processing units.

Description of the Related Art

There are times when a core or other type of processing element is not fully compute-constrained or memory-constrained. That is, the core or processing element has processing resources available which are capable of processing additional work. In these circumstances, processing cycles are often wasted. In addition, in some instances it may be more power efficient to have work done by a first type of processing element (e.g., a CPU core) instead of a second type of processing element (e.g., a GPU compute engine).

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIG. 3 is a block diagram of a register architecture according to one embodiment of the invention.

FIG. 11 illustrates a block diagram contrasting the use of a software instruction converter to convert binary instructions in a source instruction set to binary instructions in a target instruction set according to embodiments of the invention;

FIG. 15A illustrates one embodiment of a method for implementing a snoop instruction;

FIG. 15B illustrates one embodiment of a method for implementing an advertisement instruction;

DETAILED DESCRIPTION

Figure 4A:
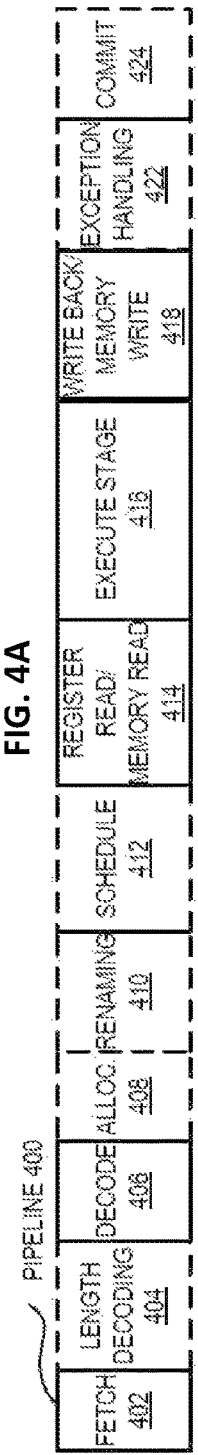
FIG. 4A is a block diagram illustrating both an exemplary in-order fetch, decode, retire pipeline and an exemplary register renaming, out-of-order issue/execution pipeline according to embodiments of the invention.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*$index+base).

Displacement Field 162A—its content is used as part of memory address generation (e.g., for address generation that uses $2^{scale}*$index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 1546, whose content distinguishes which one of a number of data transforms is to be performed (e.g., no data transform, swizzle, broadcast).

In the case of a memory access 120 instruction template of class A, the alpha field 152 is interpreted as an eviction hint field 1526, whose content distinguishes which one of the eviction hints is to be used (in FIG. 1A, temporal 1526.1 and non-temporal 1526.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]—mmmmm) includes content to encode an implied leading opcode byte. W Field 264 (VEX byte 2, bit [7]—W)—is represented by the notation VEX.W, and provides different functions depending on the instruction. The role of VEX.vvvv 220 (VEX Byte 2, bits [6:3]—vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 268 Size field (VEX byte 2, bit [2]—L)=0, it indicates 28 bit vector; if VEX.L=1, it indicates 256 bit vector. Prefix encoding field 225 (VEX byte 2, bits [1:0]—pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

Figure 4B:
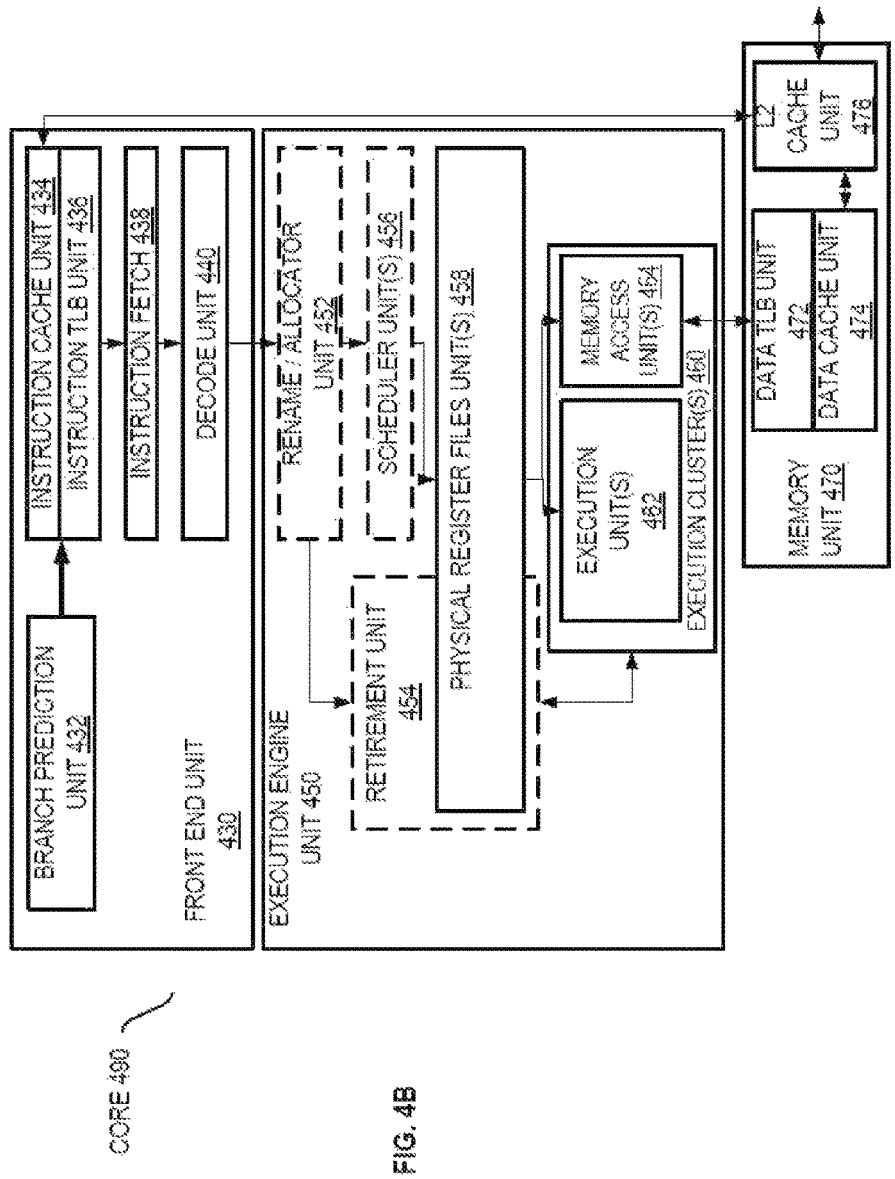
FIG. 4B is a block diagram illustrating both an exemplary embodiment of an in-order fetch, decode, retire core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 5B:
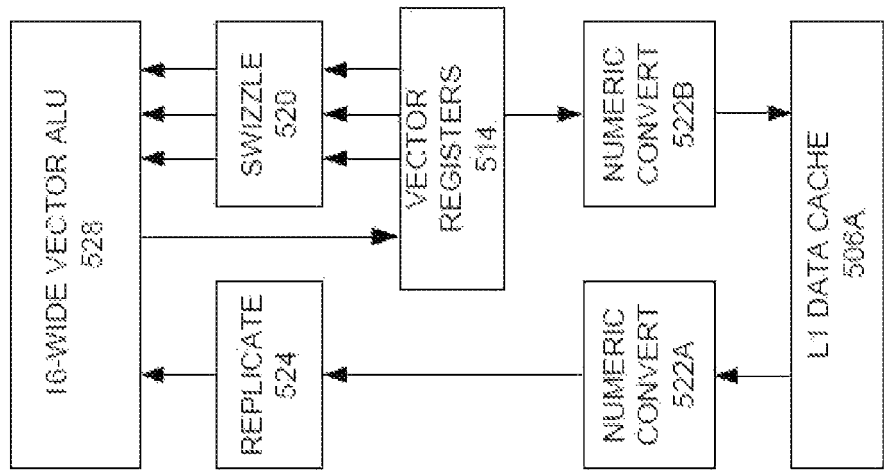
FIG. 5B illustrates an expanded view of part of the processor core in FIG. 5A according to embodiments of the invention.
Figure 5A:
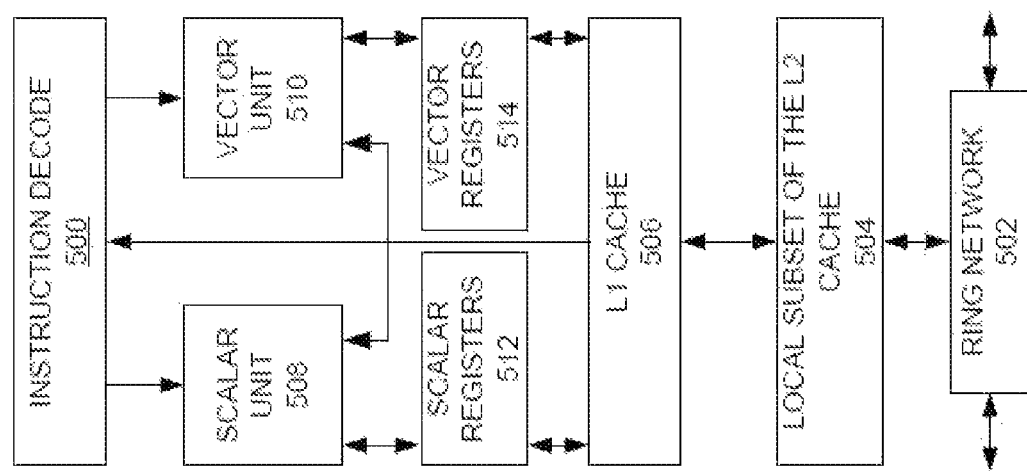
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
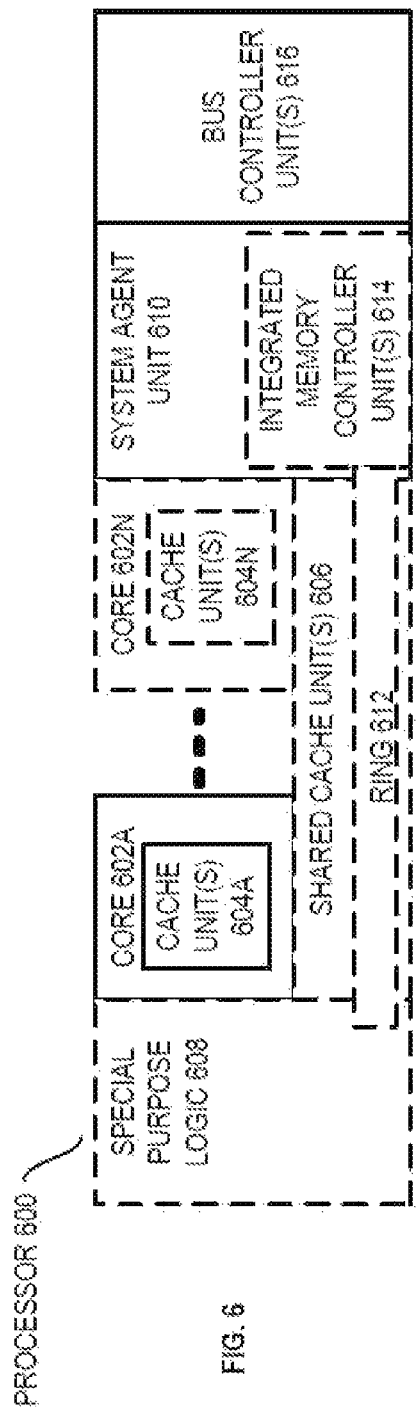
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
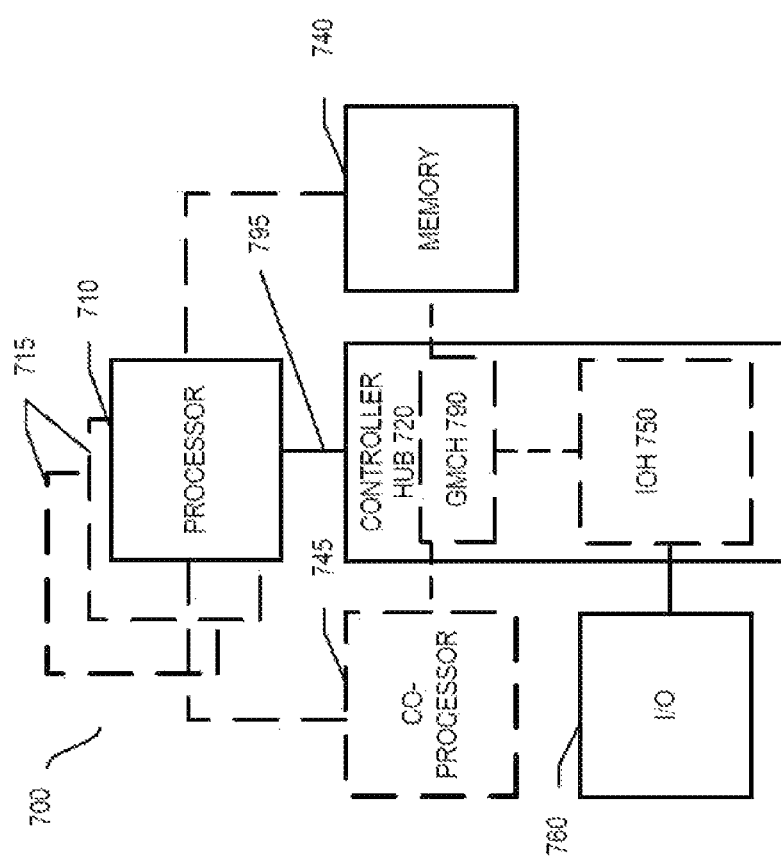
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/

Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
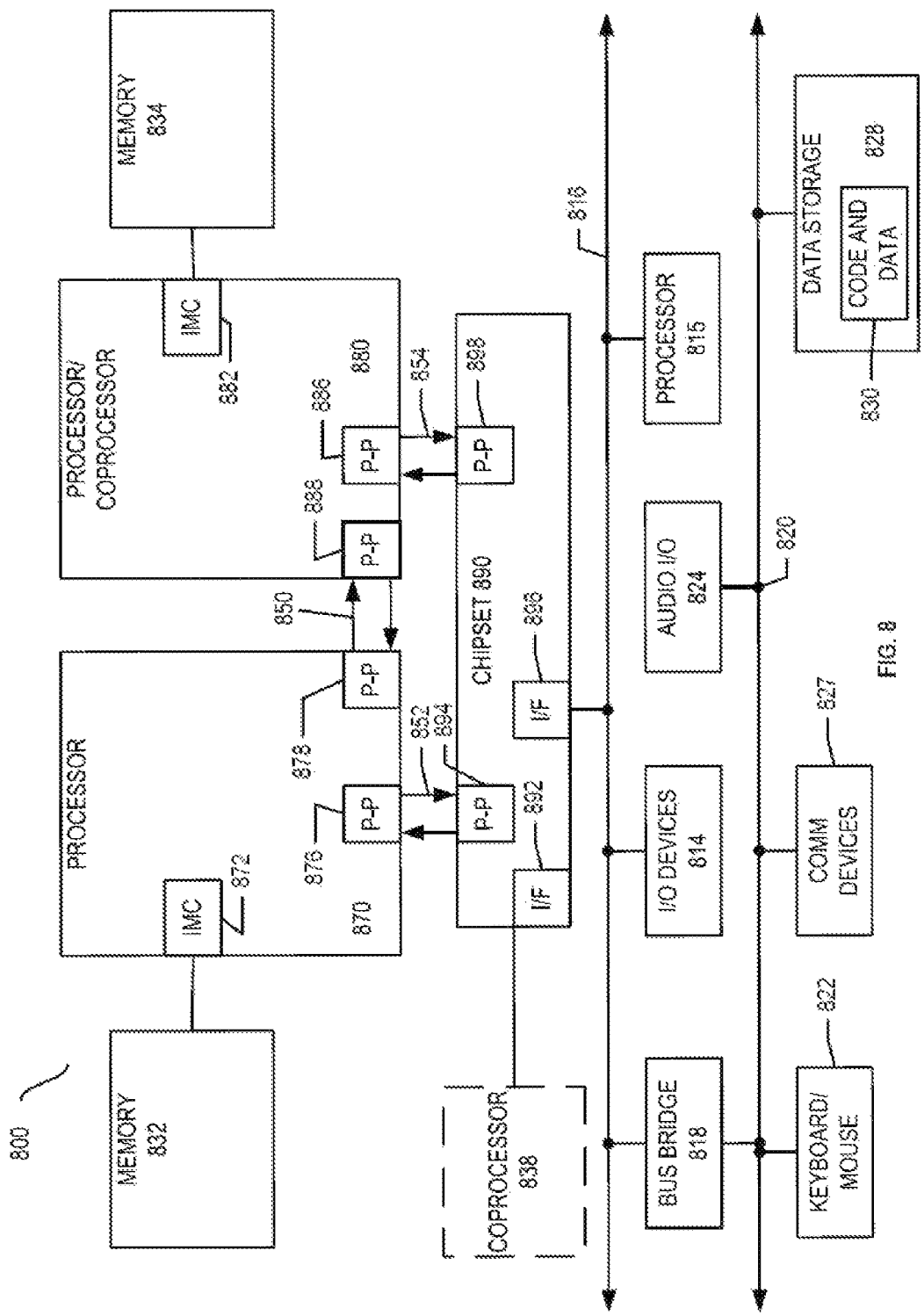
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
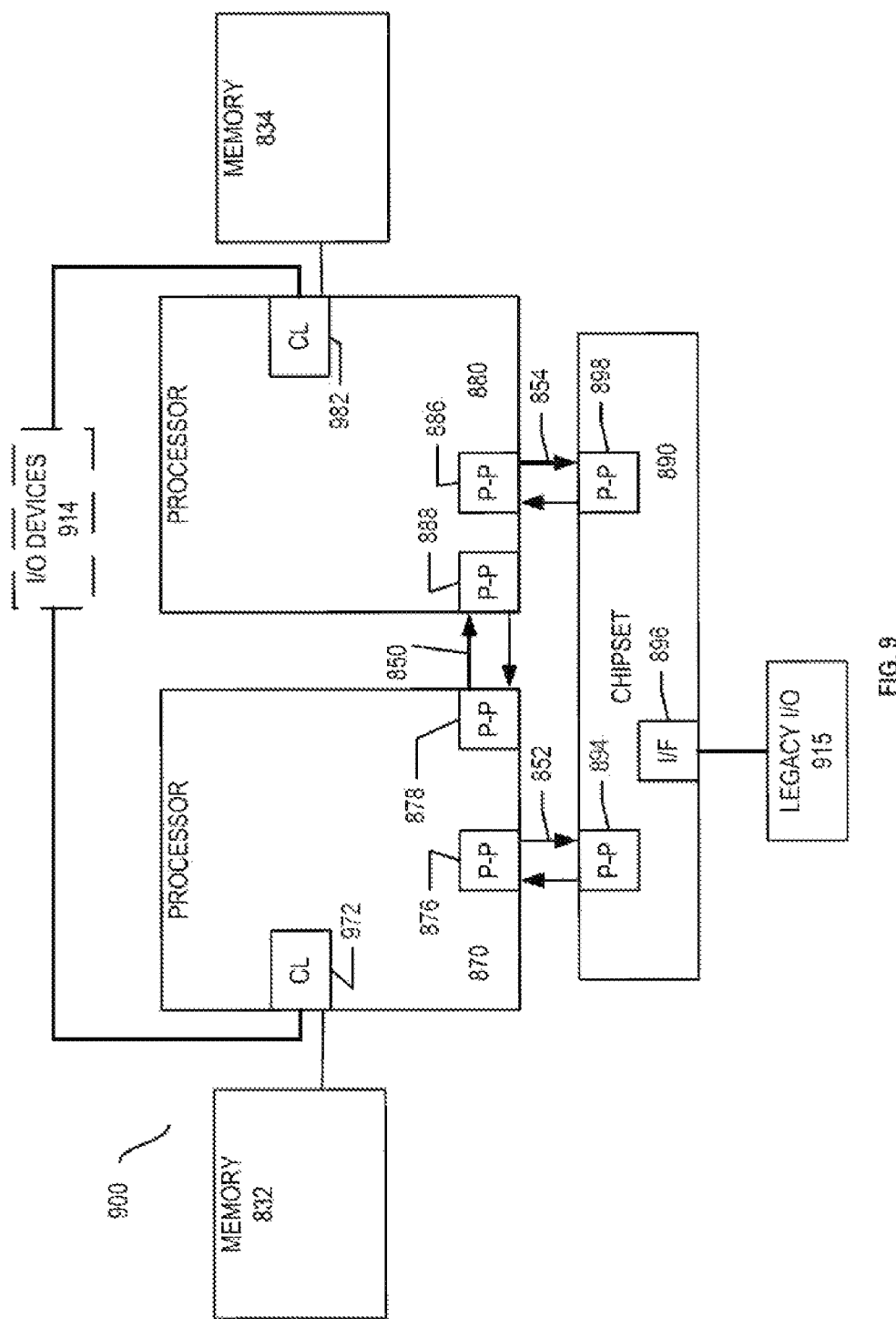
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
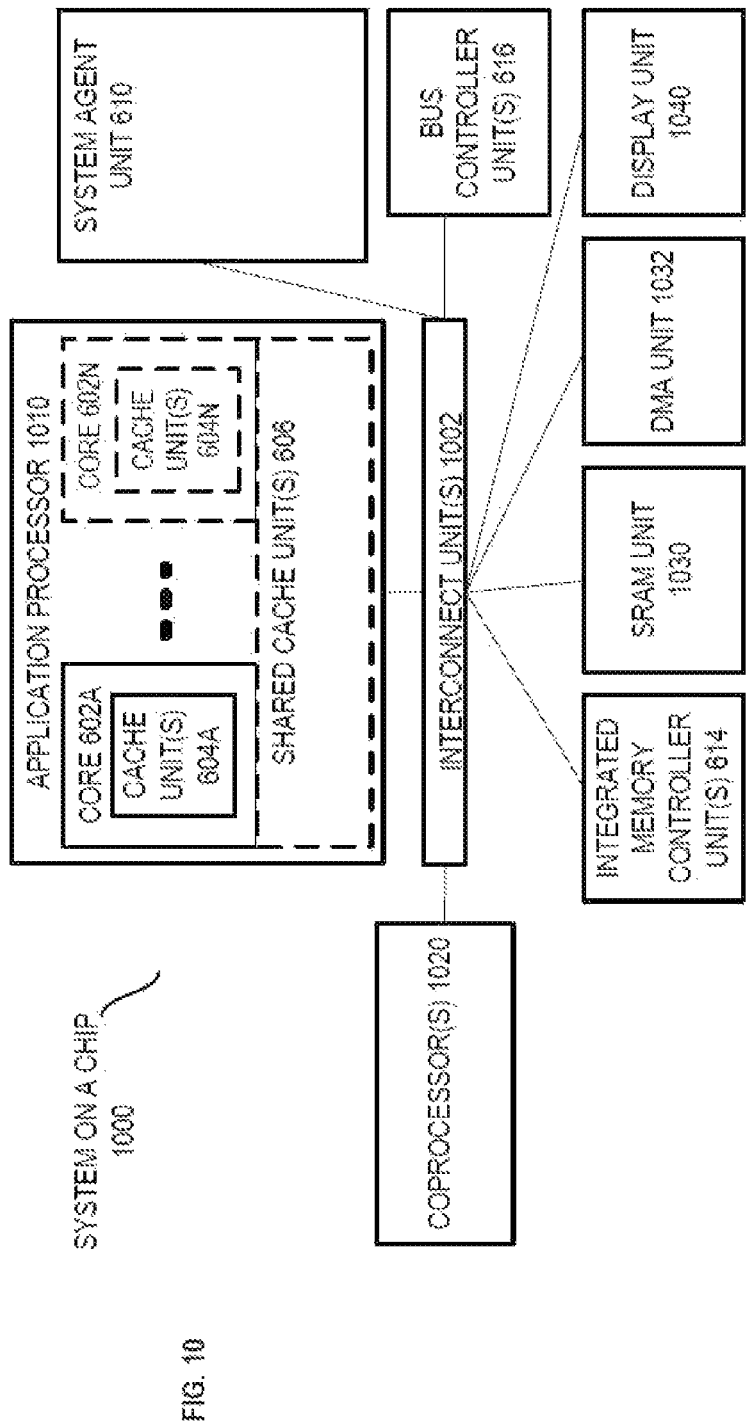
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Method and Apparatus for Efficiently Offloading Work Between Processing Units

Various embodiments of methods, apparatus, systems, and non-transitory computer-readable storage media for core-to-core offload of one or more tasks are described. In particular, a task (e.g., some proper subset of code such as a sub-portion of a loop, a loop, etc.) that was to execute on a first core is instead executed on at least a second core as a helper core (in other words, offloaded from the first core to at least the second core). The second core executes the task and makes the result available to the first core for the first core to use in subsequent processing.

As there are times when a processor core is not fully compute, memory, and/or input/output (I/O) constrained without core-to-core offload there may be cycles of that core left behind. In the above scenario, the second core is not fully constrained and could handle additional work and the first core could use some help in getting the work done more efficiently (in terms of time and/or energy). Additionally, some schemes push out work to a graphics processing unit (GPU) when a core of a central processing unit (CPU) cores runs into a bottleneck or because that is a traditional type of offload. This is unlikely to be power efficient as GPUs tend to use significantly more power than even a fully loaded CPU.

As noted in the background, traditional migration involves an offload of shared code to an accelerator such as a GPU or to a heterogenous core. In either case, the operating system was involved in that offload. Individual cores were not aware if they could handle work from other cores and were reliant on the operating system (OS). Involving the OS in the offload means that any offload has to deal with the inefficiencies of approval from the OS.

Embodiments detailed herein provide one or more mechanisms for such offloading without requiring an operating system to be involved. As such, the cores themselves are aware of what work they can and cannot handle. Typically, the OS is not informed of this offload. However, in some embodiments a core may tell an operating system scheduler to hold off on scheduling new work while it is acting as a helper core, the OS does not tell a core that it cannot send work to another core. Without involving the OS, the core-to-core offload described herein is more efficient.

One embodiment of the invention comprises a processor with circuitry and/or logic for offloading work from a first processing element to a second processing element to improve performance and/or power usage. As used herein, a "processing element" (PE) may be any discrete circuit capable of independently processing an instruction including, but not limited to, CPU cores, GPU cores, digital signal processing (DSP) cores, and accelerators such as matrix or tensor processing units. Thus, while some embodiments are described below in the context of CPU cores, the underlying principles of the invention are not limited to this implementation.

Moreover, while certain embodiments are described below on homogeneous cores, the underlying principles of the invention may be implemented with heterogeneous cores. For example, the heterogeneous cores may comprise different microarchitectures (e.g., a combination of "big" or high performance cores and "little" or low performance cores) but may be configured to process the same instruction set architecture (ISA). Alternatively, the heterogeneous cores may support different instruction set architectures (ISAs). In this implementation, a first core may offload an instruction from a first ISA and the second core may responsively execute a corresponding instruction from a second ISA. This may be accomplished by mapping instructions from the first ISA to instructions of the second ISA and/or by performing binary translation operations to translate the instruction(s) from the first ISA to the second ISA (e.g., statically by a compiler and/or dynamically at runtime). For simplicity, the cores in the embodiments described below will be assumed to support the same ISA.

In prior systems, any "offload" of shared code was to an accelerator such as a GPU or another core such as in a "big"/"Little" arrangement. In these systems, the operating system (OS) was always involved in the offload process, resulting in significant inefficiencies associated with OS approval and coordination. However, these existing systems do not allow cores to dynamically communicate and offload work to improve performance without OS intervention.

One embodiment of the invention comprises a new set of instructions for managing offload operations transparently to the OS. These include, but are not limited to, a snoop instruction to generate an inter-core snoop message to identify cores capable of handling an offload. As used herein, the core which requests an offload is referred to as the "parent" core and the core which performs the offloaded operations is referred to as the "helper" core. In response to the snoop message generated by the parent core, one or more helper cores which have sufficient available bandwidth can respond with an affirmative acknowledge message.

In addition, in one embodiment, a prospective helper core executes an advertisement instruction to advertise its current availability to other cores via an inter-core advertisement message. This may include a value (e.g., a percentage or other number) to indicate the current load on the core or simply an indication that the prospective helper core is available.

Once a helper core has been identified by the parent core to handle the offload operations, a "start offload" instruction generates an inter-core message to cause the helper core to begin processing offload operations. Once the offloaded work is complete, the helper core may execute an "end offload" instruction and transmit an "offload end" message to notify the parent core that the offload operations are complete.

In any of the above implementations, the cores may share results of the offload operations using specified regions in system memory. For example, the "start offload" instruction and message may include a pointer to a region in memory where relevant data and program code. One or more work descriptors stored in the memory region may specify the work to be completed by the offload operation. Similarly, once the offload operation is complete, the end offload instruction and message may include a pointer which the parent core may use to access the results of the offload. The work descriptor may use any suitable format and may specify a single job or may contain a pointer to a queue of jobs. In the latter case, the work descriptor includes a pointer to the job request queue in an application's address space.

FIGS. 12A-12D illustrate specific examples with a parent core 1201B and two prospective helper cores 1201A, 1201C. Each core 1201A-C determines whether it can accept offload work based on its phase tracker 1207A-C, which provides an indication as to whether the core has currently accepted work from another core. Performance monitoring circuitry 1210A, 1210C includes counters to track statistics related to instruction execution such as the number of instructions executed/retired per time period and the cache hit rate. In one embodiment, the counters of the performance monitoring circuitry 1210A, 1210C are read to determine whether the cores 1201A, 1201C have sufficient bandwidth to handle an offload request.

As a core is running, its performance monitoring circuitry 1210A, 1210C monitors performance of each respective core. How a core is performing at a given point in time impacts whether it can act as a helper core. For example, if the core is continually retiring instructions, then it is likely compute-bound and should not be considered for a compute intensive task. Similarly, if the core is already experiencing significant cache misses (and therefore memory accesses), adding a memory intensive task would be impractical. In one embodiment, the inter-core offload circuitry 1205A, 1205C evaluates the data from the performance monitoring circuitry 1210A, 1210C, respectively, to render its determination.

Inter-core offload circuitry 1205A-C of each core 1201A-C, respectively, transmits and receives the messages described herein over an interconnect fabric 1206. The inter-core offload circuitry 1205A-C may be associated with or integrated within the execution circuitry of each individual core 1210A-C and may generate messages in response to the various instructions described herein. In one embodiment, the inter-core offload circuitry 1205A-C comprises a finite state machine (FSM) with a specified set of inter-core offload states and transitions between the states. However, the underlying principles of the invention are not limited to a FSM implementation.

The interconnect fabric 1206 may comprise a crossbar, ring interconnect, or any other high speed, on-chip communication structure. In one embodiment, the interconnect fabric 1206 comprises the same cache coherent interconnect used by the cores to ensure cache coherency (i.e., between internal L1, L2 caches as well as shared L3, L4 caches).

Figure 12A:
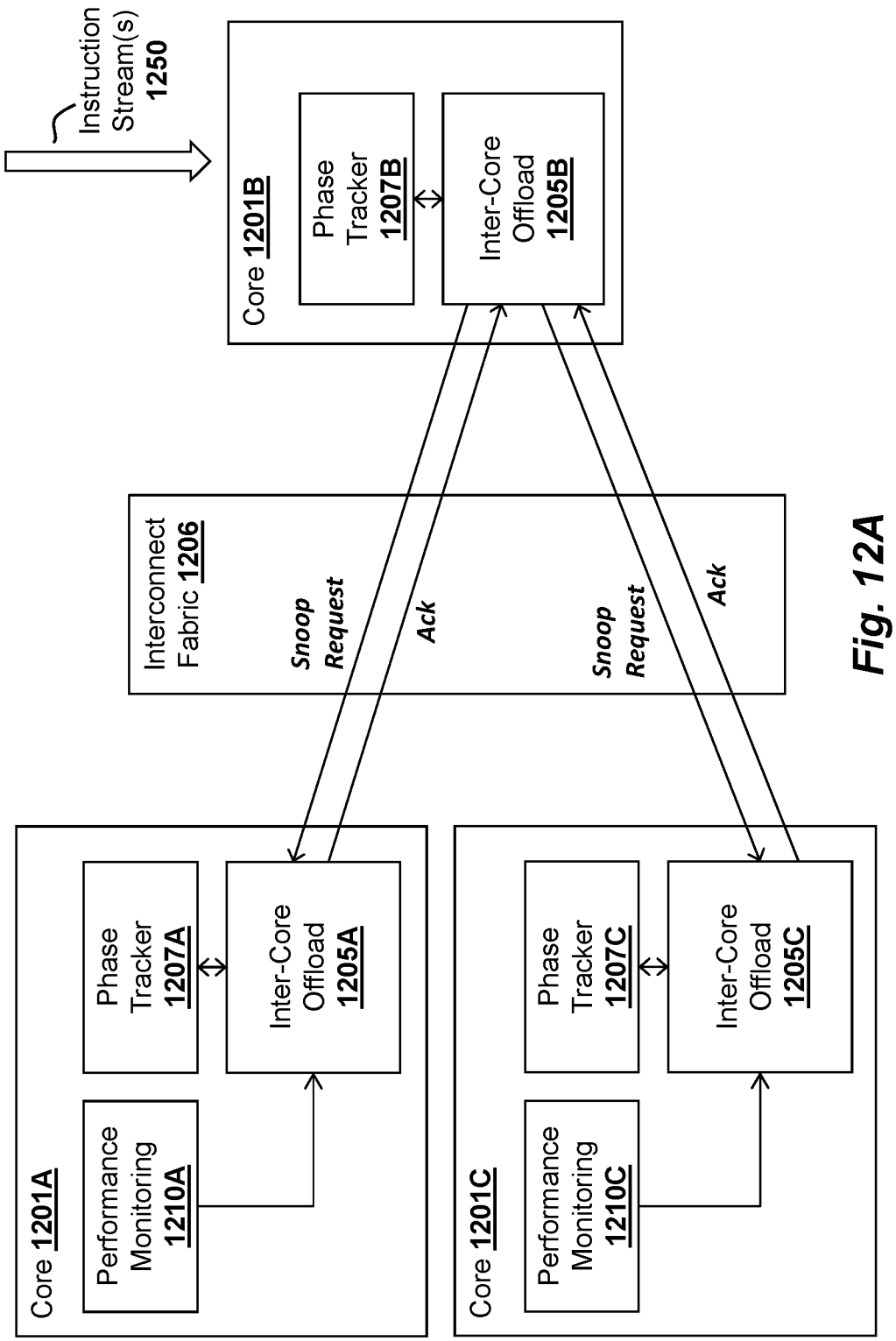
FIG. 12A-D illustrate different implementations of offload instructions.

In the example shown in FIG. 12A, core 1201B executes a snoop request instruction included in a current instruction stream 1250. In response, inter-core offload circuitry 1205B transmits a snoop request to cores 1201A, 1201C. Inter-core offload circuitry 1205A, 1205C, upon receipt of the snoop request, determines whether each respective core 1201A, 1201C is in a position to accept offload work. If so, then the respective inter-core offload circuitry 1205A, 1205C transmits an acknowledgement message to inter-core offload circuitry 1205B to inform core 1201B whether (or not) cores 1201A, 1201C are capable of executing offload work.

Figure 12B:
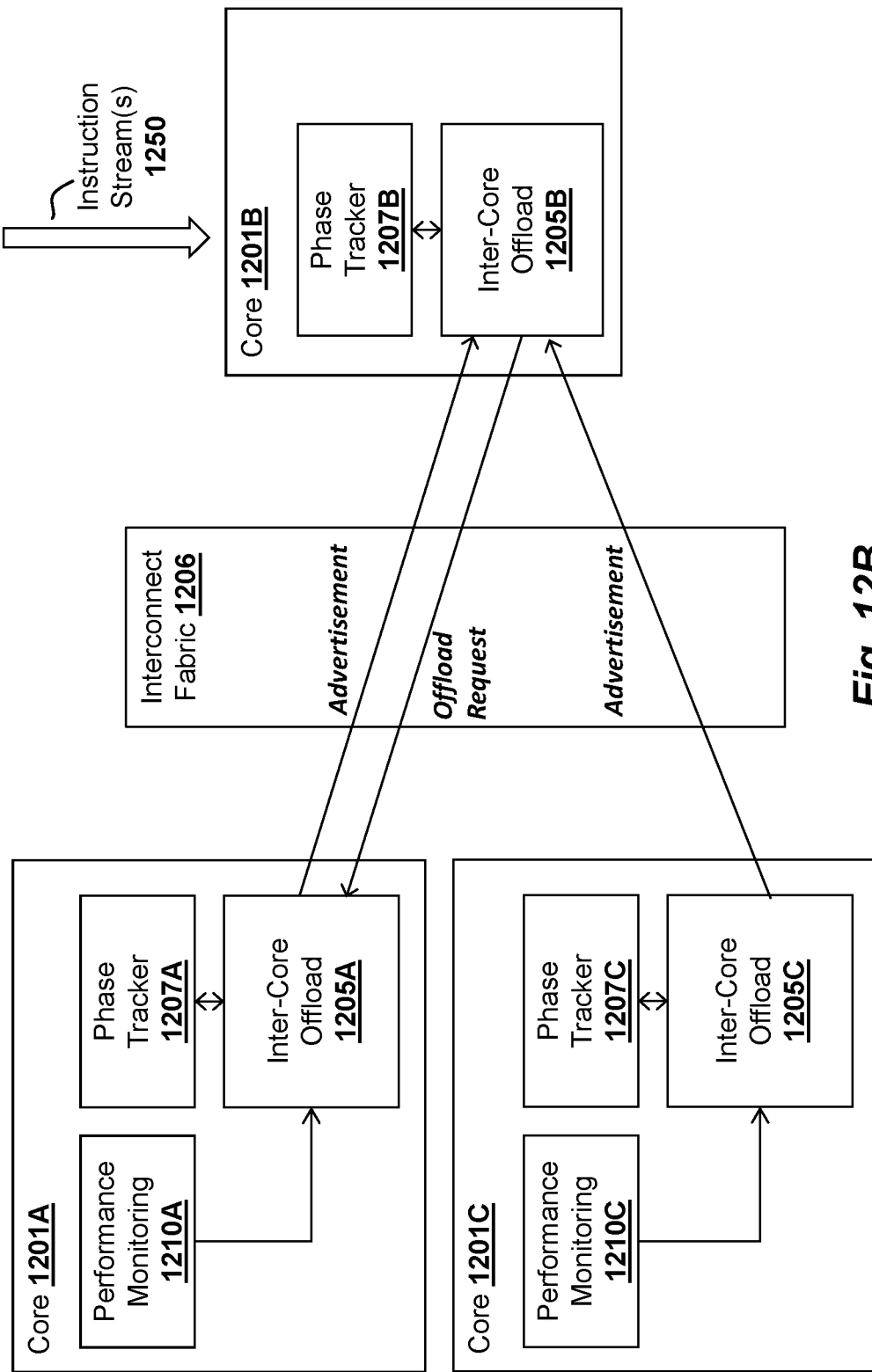

FIG. 12B illustrates one embodiment in which inter-core offload circuitry 1205A, 1205C proactively transmits an advertisement message to inter-core offload circuitry 1205B informing core 1201B of the availability of the respective cores 1201A, 1201C. In one embodiment, the advertisement message is transmitted responsive to an advertisement instruction executed within the processing pipeline of cores 1201A, 1201C. The advertisement message may include a Boolean indicator (i.e., a single bit) which informs core 1201B of the availability of cores 1201A, 1201C (e.g., 1=available; 0=unavailable). Alternatively, or in addition, the advertisement message may include a value within a designated range (e.g., between 0 and 3, 0 and 7, etc) indicating a level of available bandwidth. For example, if 50% of the execution resources of core 1201A are currently being used, then the value transmitted in the advertisement message may reflect this load.

Core 1201B may then choose to offload work to one of the cores 1201A, 1201C based on the current load values. For example, it may choose a core with the smallest current load or it may choose a core with an existing load but with sufficient bandwidth to handle the offload request (i.e., so that a core in an inactive or low power state does not need to be re-activated, thereby conserving power).

Figure 12C:
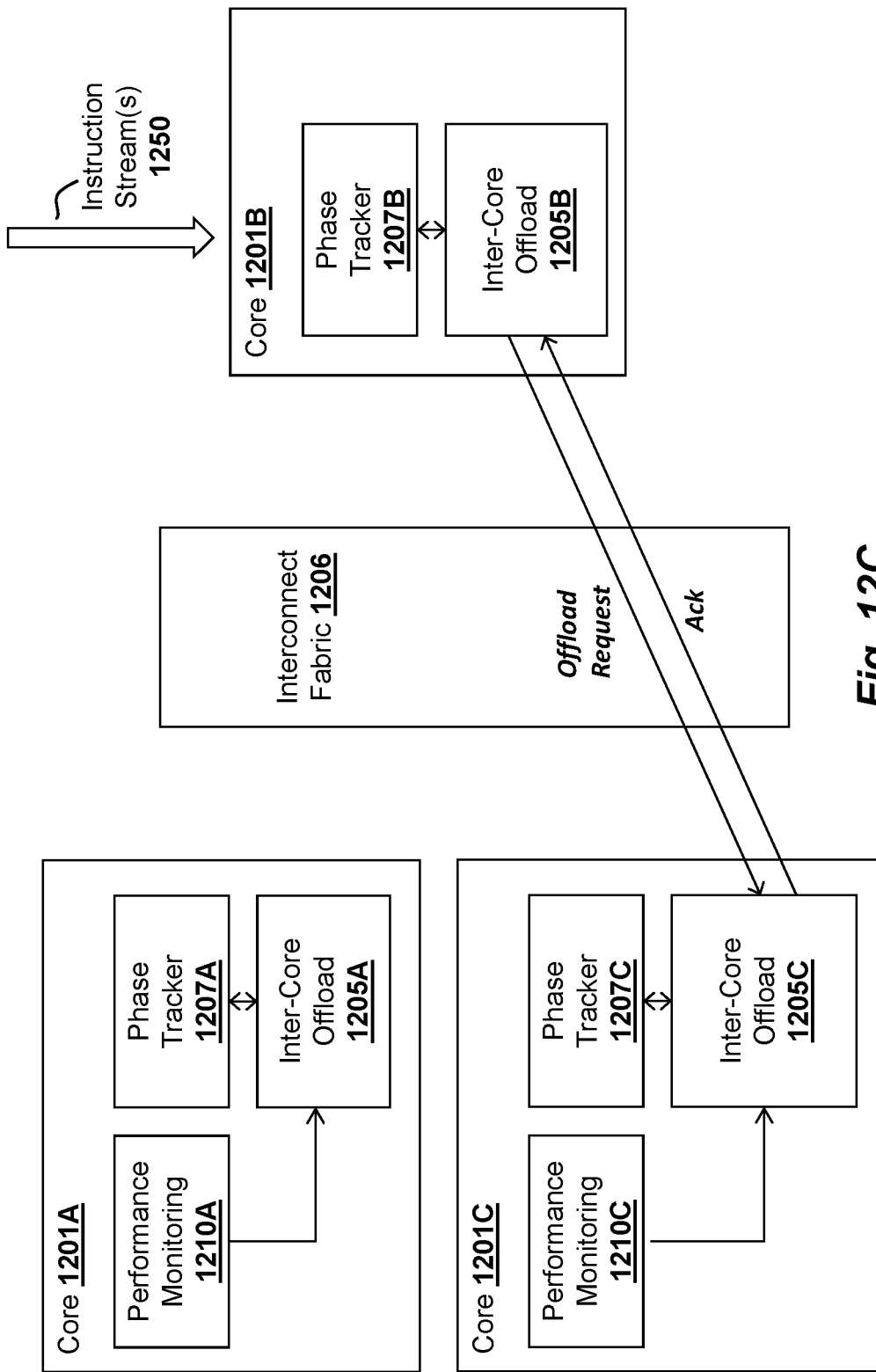

FIG. 12C illustrates an example in which an offload request is transmitted from inter-core offload circuitry 1205B of core 1201B to inter-core offload circuitry of core 1201C. In this example, core 1201C transmits an acknowledgement message to inform core 1201B that it is accepting the work and may also update its phase tracker 1207C to show that it has accepted this additional work. As mentioned, in one embodiment, the offload request comprises a pointer to a region in shared memory from which core 1201C can begin fetching instructions and processing data (e.g., in accordance with a work descriptor stored in the shared memory region).

Figure 12D:
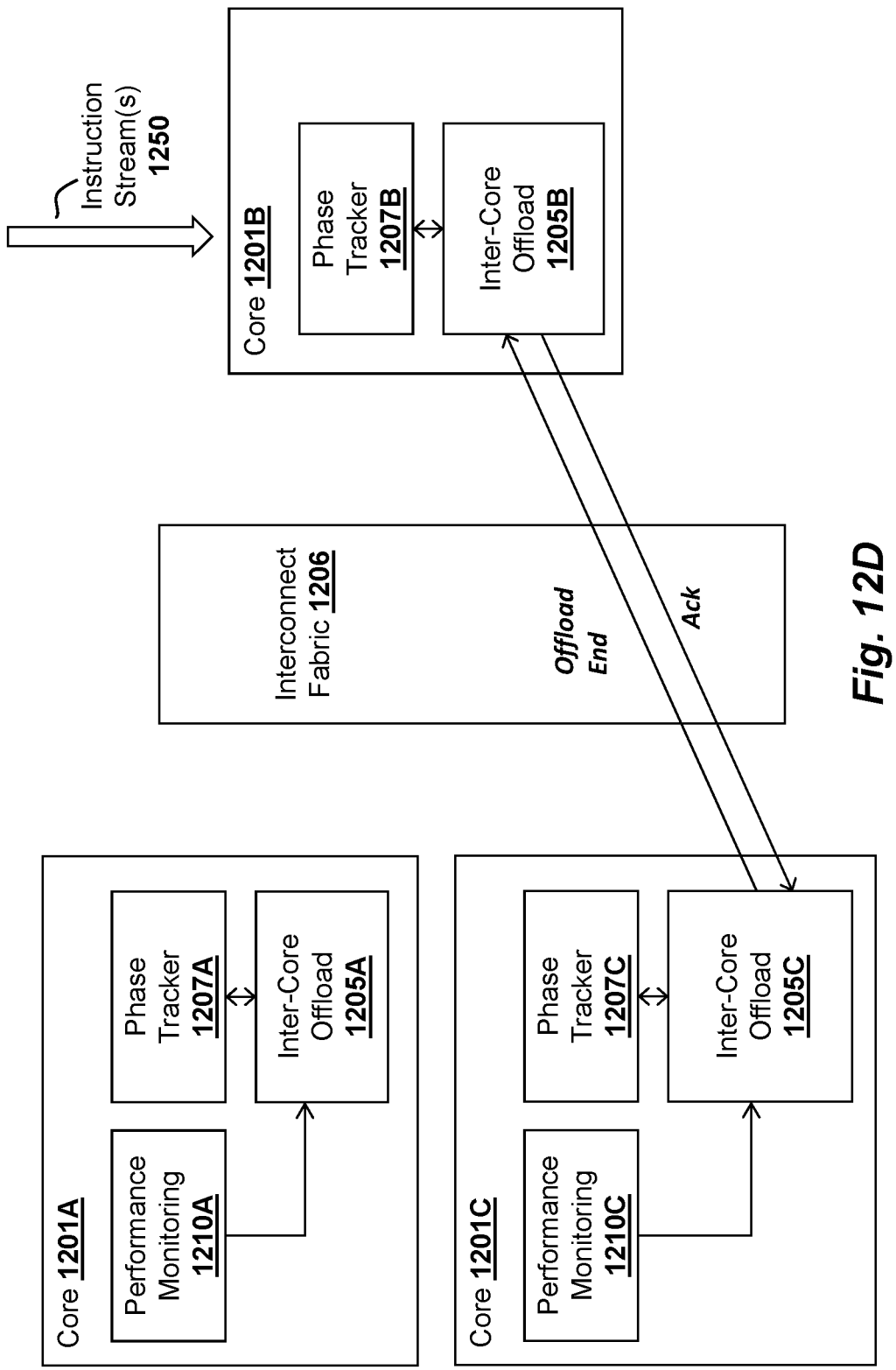

As indicated in FIG. 12D, when core 1201C has completed the offload work, the inter-core offload circuitry 1205C transmits an offload end message to inter-core offload circuitry 1205B to inform core 1201B that the work is complete. The offload end message may include a pointer to the results or the location of the results may be known by core 2101B (i.e., specified in the offload message). Core 1201C may then update its phase tracker 1207C to indicate that it is no longer performing offload work. In one embodiment, the offload end message is not permitted to execute until it can be confirmed that the offload work has started (i.e., the offload end should not be allowed unless an offload is in progress).

As mentioned, in all of the above implementations, the inter-core offload circuitry 1205A-C may be integrated within the execution circuitry of each respective core 1201A-C, operable in response to execution of offload instructions.

Figure 13:
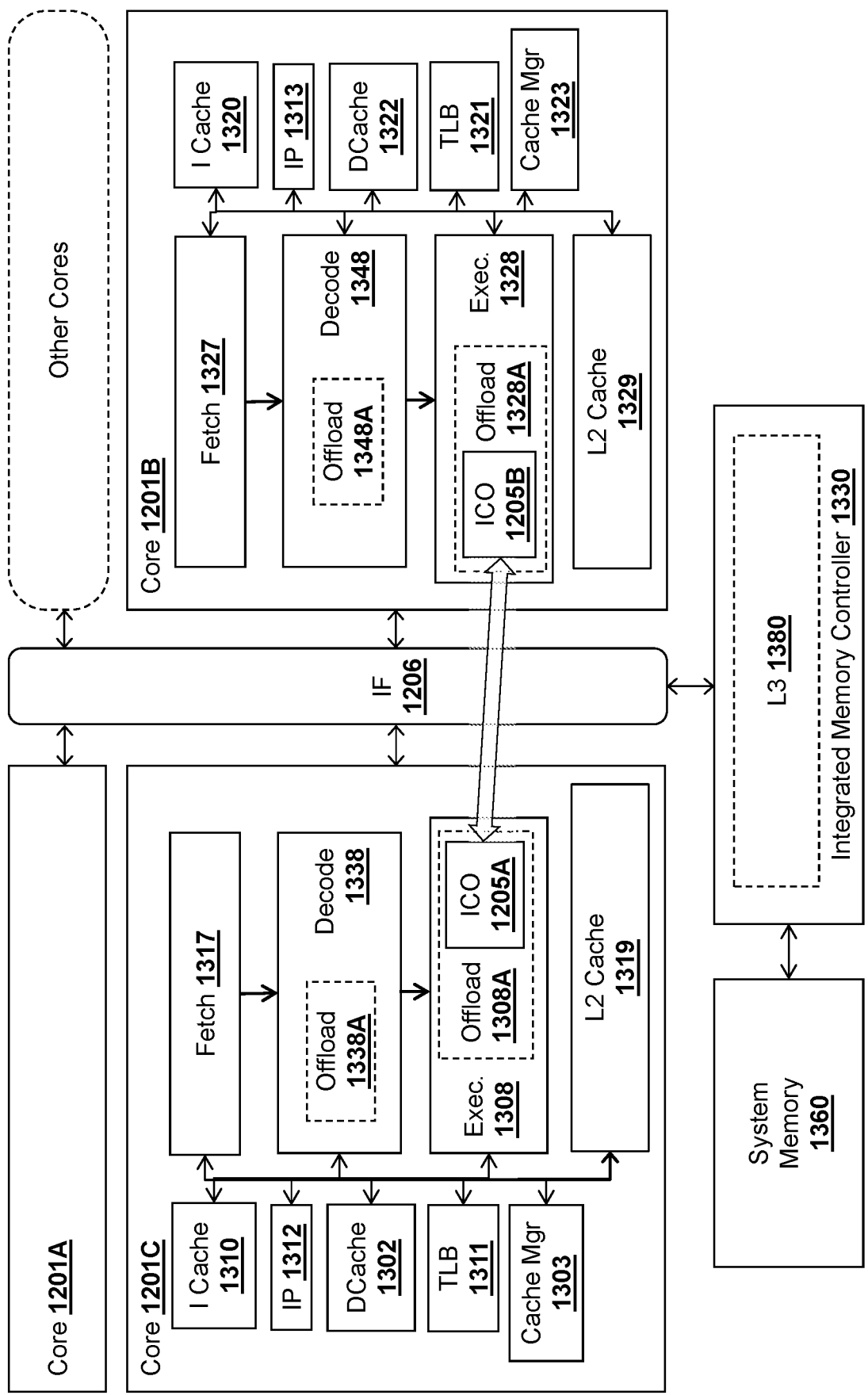
FIG. 13 illustrates an example processor architecture on which embodiments of the invention may be implemented.

In FIG. 13 offload execution circuitry 1308A within the execution stage 1308 of core 1201C is shown, including inter-core offload circuitry 1205A. Similarly, offload execution circuitry 1328A within the execution stage 1328 of core 1201B is shown, including inter-core offload circuitry 1205B. As indicated, in response to execution of offload instructions by offload circuitry 1308A and 1328A, respective inter-core offload circuitry 1205A and 1205B exchanges messages over the fabric interface 1206.

FIG. 13 illustrates additional details of one embodiment including an integrated memory controller (IMC) 1330 with a shared Level 3 cache 1380 coupled to the cores 1201A-C over the coherent fabric 1206 and providing access to a system memory 1360.

In one embodiment, each of the cores 1201A-C includes an instruction pipeline for performing simultaneous, out-of-order (or in-order) execution of instruction streams including instruction fetch circuitry 1317, 1327 which fetches instructions from system memory 1360 or L1 instruction caches 1310, 1320, respectively. Decode circuitry 1338, 1348 decodes the instructions and execution circuitry 1308, 1328 executes the instructions. As illustrated, decode circuitry 1338 and 1348 includes circuitry 1338A and 1348, respectively, to support the new offload instructions described herein (e.g., to parse/translate the offload instruction opcodes and operands described herein and identify a set of execution resources within the execution circuitry 1308A, 1328A).

Other illustrated components include instruction pointer registers 1312, 1313 to store a current instruction pointer address identifying the next instruction to be fetched, decoded, and executed. Instructions may be fetched or prefetched from system memory 1360 and/or one or more shared cache levels, such as the L3 cache 1380. The illustrated TLBs 1311, 1321 store virtual-to-physical address translations previously read from page tables and used by the fetch, decode and execution circuitry to access instructions and data from system memory 1360. The TLB to physical address translations for instructions and data processed by the decode circuitry 1309 and execution circuitry 1308.

In one embodiment, cache managers 1303, 1323 perform state management operations on cache lines to implement the cache coherency protocols of the processor. These cache coherency protocols ensure that the data is maintained in a coherent state between the system memory 1360, L3 cache 1380, and core caches 1319, 1329, 1310, 1320, 1312, 1322. For example, in response to read/write requests, the cache managers 1303, 1323 may allow, disallow, and/or invalidate certain cache lines to ensure a consistent set of data.

In this embodiment, each offload instruction may include an instruction opcode specifying the operations to be performed and one or more operands specifying values/registers to be used to execute the opcode. For example, a first operand may specify whether the operation is to be directed to a specific helper core (e.g., Core ID 0, Core ID 1, etc) or to all helper cores (e.g., Core ID $ where $ comprises a wildcard value). A second operand (or the same operand) may identify the parent core (i.e., the source of the request). A third operand (or the same operand) may specify an instruction pointer identifying the next instruction to be fetched to perform the offload operations and a third operand may specify the address for accessing data and storing results and/or state information related to the instruction (or an address from which to access the state information).

In one embodiment, the phase tracker 1207A-C mentioned above comprises information related to a current offload operation being performed. For example, the phase tracker of a helper core may include the identity of one or more parent cores (e.g., the core IDs) and the phase tracker of a parent core may include the identity of one or more current helper cores (i.e., the core IDs of those cores currently helping with an offload). In addition, the phase tracker 1207A-C may include an indication of a completion mode such as where to save the data resulting from the offload (e.g., registers, memory location, etc) and/or where to send the data (e.g., in cases where the data can be transmitted directly to the parent core).

The determination as to whether a core should request or perform an offload may be determined statically (e.g., by a compiler before runtime) or dynamically (e.g., based on a dynamic evaluation of the instruction stream). In either case, the program code is evaluated to determine how amenable it is to parallelization. For example, if there are a significant number of dependencies between instructions in the instruction stream 1250, then offloading the work may not improve performance or may even degrade performance. By contrast, if the instruction stream requires a large number of independent operations (e.g., such as data parallel operations) then offloading will tend to improve performance.

In one embodiment, the offload operations are specified via instruction "hints" inserted by the compiler and/or dynamically during runtime as described herein. The parent core may then evaluate these hints, potentially in combination with other variables (e.g., the workload on potential helper cores, the amount of potential parallelization, etc) to render offload decisions.

In one embodiment, the program code may be executed using offload operations and may also be executed without offload operations to determine whether to permit offloading for a given thread, process, or application. For example, thread/application tracing techniques may be used to determine whether to use offloading (e.g., by measuring execution time of different code blocks). If offloading is used, specific portions of the program code may be identified for offloading (e.g., those without significant dependencies). This may be accomplished, for example, by inserting offload snoop instructions, start offload instructions, and end offload instructions into the program code (e.g., into the instruction stream 1250 and the program code identified by work descriptors). In any case, once offload instructions are inserted into the program code, the offload operations described herein are executed without OS intervention.

In one embodiment, the control registers of the various cores 1201A-C are used to track the progress of offloads. For example, a control register such as a MXCSR register may be updated with a value for each loop iteration (e.g., a value of 50 for 50 iterations) and decremented on each individual iteration. When the value in the control register reaches 0, then the offload is complete. The "end offload" instruction may then be executed to provide results to the parent core.

In any of these embodiments, offload instructions as described herein may be dynamically inserted on the helper core side (e.g., to ensure that the helper core generates an end offload instruction at the appropriate time). As mentioned, the instruction insertions may be done dynamically during runtime or statically by a compiler.

Figure 14A:
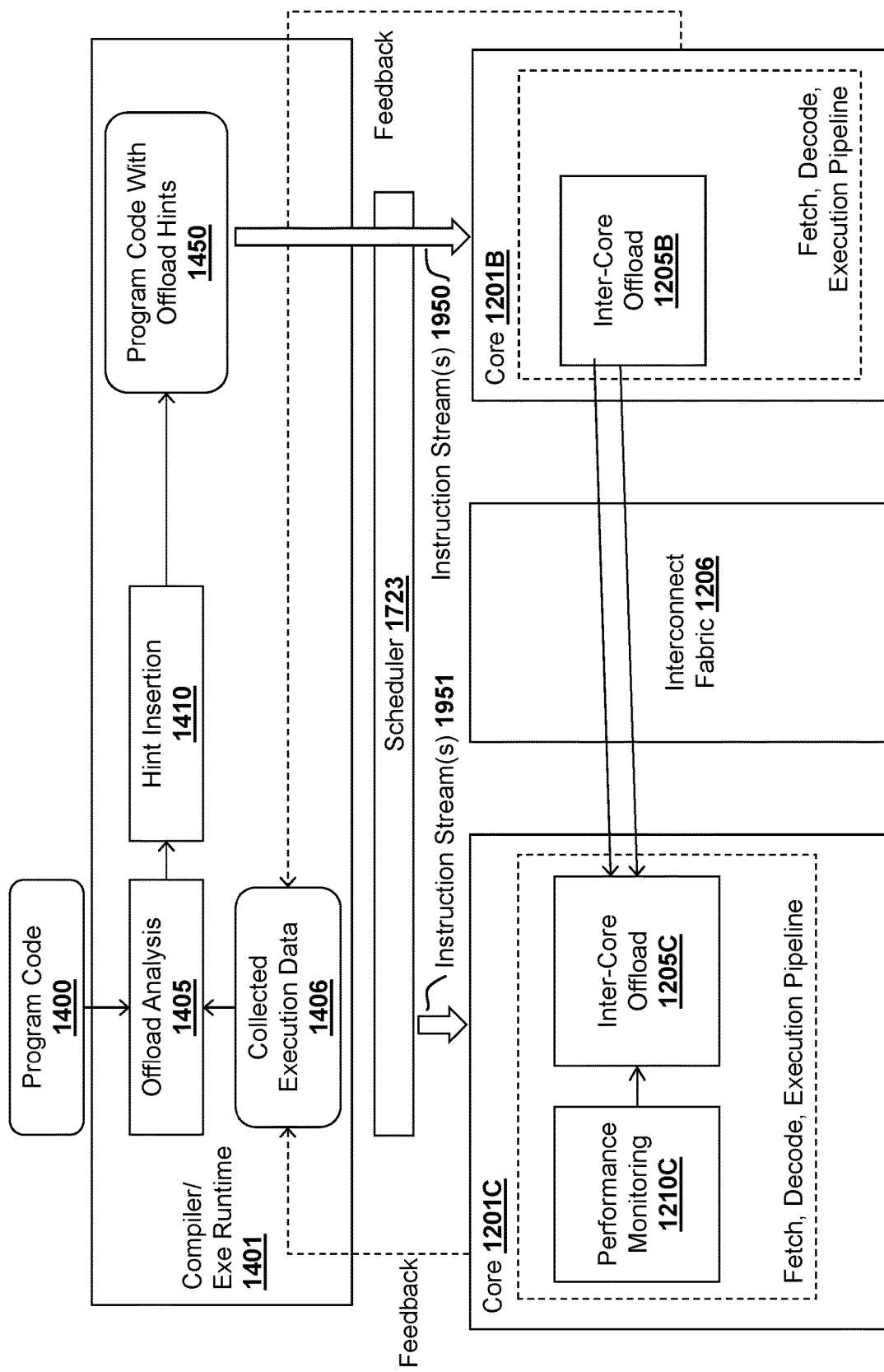
FIG. 14A illustrates one embodiment of an architecture for inserting hints.

FIG. 14A illustrates one embodiment in which a compiler or execution runtime 1401 inserts instruction "hints" into program code 1400. In particular offload analysis 1405 is performed using execution data 1406 collected during prior executions of the program code 1400. As mentioned, the offload analysis 1405 may evaluate the capacity of the program code 1400 to be executed in parallel (e.g., based on dependencies between the instructions and/or resources).

Based on the analysis, hint insertion 1410 is performed to generate program code with offload hints 1450. The parent core 1201B then executes the program code 1450, offloading work to other cores 1201C as described herein based on the hints.

Figure 14B:
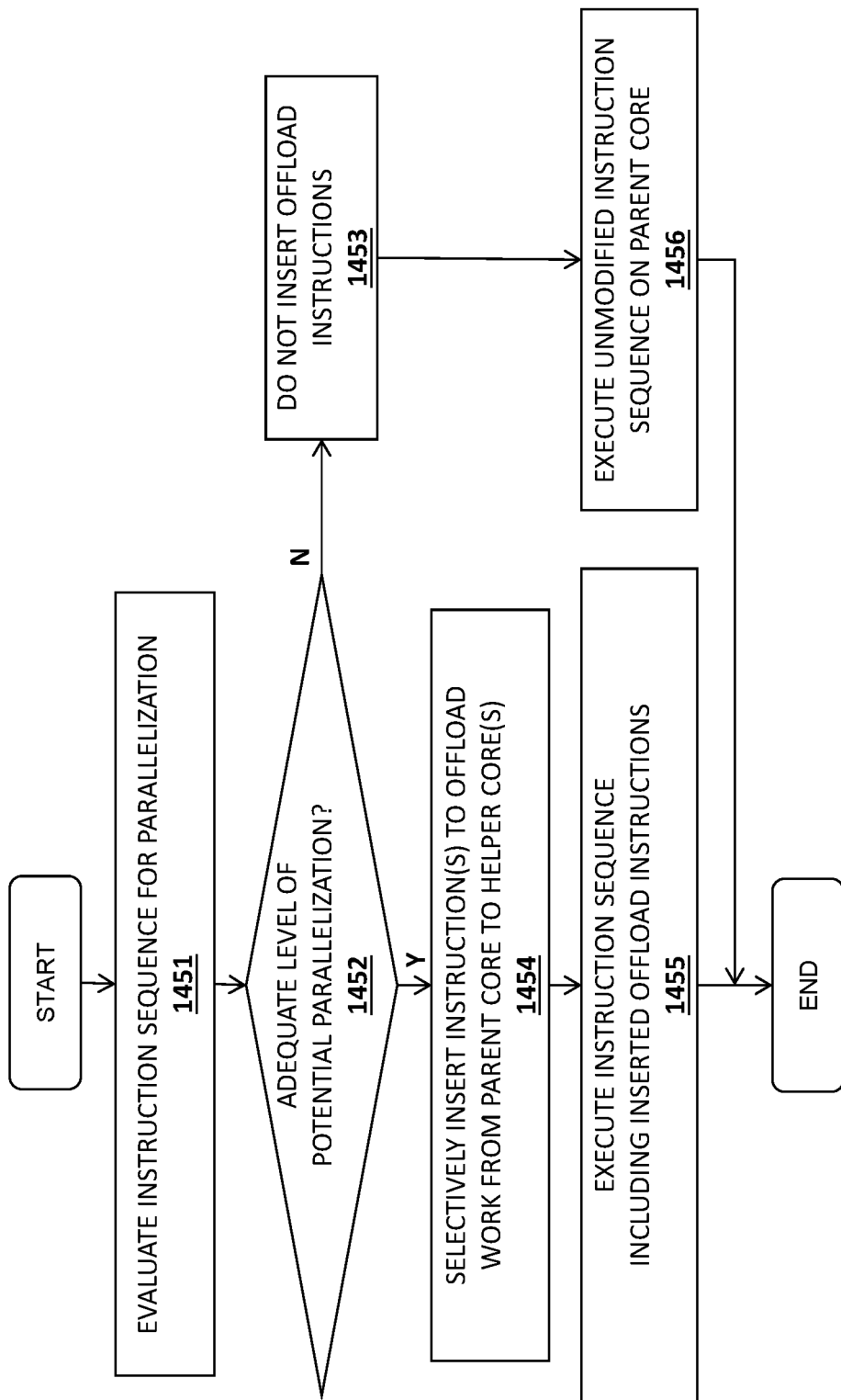
FIG. 14B illustrates one embodiment of a method for determining whether and where to insert offload hints.

A method for inserting offload instructions in accordance with one embodiment of the invention is illustrated in FIG. 14B. The method may be implemented within the context of the architectures described above, but is not limited to any particular system architecture.

At 1451 an instruction sequence is evaluated for parallelization. For example, instruction dependencies such as data dependencies and/or resource dependencies may be evaluated to determine the extent to which portions of the instruction sequence can be executed in parallel. If the instruction sequence does not include an adequate level of parallelization, determined at 1452, then at 1453 offload instruction are not inserted into the instruction sequence and, at 1456, the unmodified instruction sequence is executed on the parent core (i.e., the current core).

Assuming that adequate potential parallelization is detected, at 1454 one or more of the offload instructions described herein are selectively inserted into the instruction sequence to offload work from the parent core to one or more helper cores. For example, if a particular region of program code is determined to have parallelization potential, then portions of the region of program code may be offloaded to a helper core, in accordance with the detected instruction dependencies. At 1455, the modified instruction sequence is executed including the inserted offload instructions. Thus, at least a portion of the instructions may be offloaded responsive to a start offload instruction as described herein.

FIG. 15A illustrates one embodiment of a method for performing snoop operations. At 1501, a snoop instruction is decoded on a first core. As mentioned, the snoop instruction may include operands identifying one or more other cores. At 1502, the snoop instruction it executed and at 1503 one or more snoop requests are responsively transmitted from the first core to the one or more other cores. Those cores which have available bandwidth may transmit a response back to the first core indicating that they can process offload work. Thus, at 1504, the first core receives an acknowledgement message from at least a second core indicating that offload operations are available (i.e., that the second core can handle the additional work). In one embodiment, the first core decodes and executes an offload start instruction at 1505.

FIG. 15B illustrates a method for advertising the availability of a core's resources. As mentioned, a core may advertise its ability to handle offload work to other cores. The advertisement techniques described here may be used in combination with offload snoop operations described above. For example, advertisement messages may be transmitted on a periodic or semi-periodic basis whenever a core has processing resources available. At the same time, if another core requires offload work, it may broadcast snoop messages to proactively determine the availability of other cores. Thus, cores which are heavily loaded may tend to transmit snoop request messages while cores which are less loaded may tend to transmit advertisement messages.

At 1551, an advertisement instruction is decoded on a first core and, at 1552, the advertisement instruction is executed. In one embodiment, execution of the advertisement instruction causes the first core to check its status before transmitting an advertisement message. For example, the control/status registers of the core may indicate how busy the core is. Thus, the core may read these registers in response to the advertisement instruction to determine whether to advertise its availability. If offload work is practical given the current core state, determined at 1570, then at 1553 the advertisement message is broadcast to one or more other cores. The advertisement message may include an indication of how busy the first core is generally and/or the specific type of work it is busy processing (e.g., memory-intensive operations, independent parallel operations having a high cache hit rate, etc.). In response to the advertisement message, the first core receives an offload request from the second core at 1554. If the first core accepts the work, it transmits an acknowledgement message to the second core. At 1555, the first core begins fetching, decoding, and executing instructions associated with the offloaded work. As mentioned, it may begin fetching the instructions from a memory location specified by the second core (e.g., in the offload request).

Figure 16:
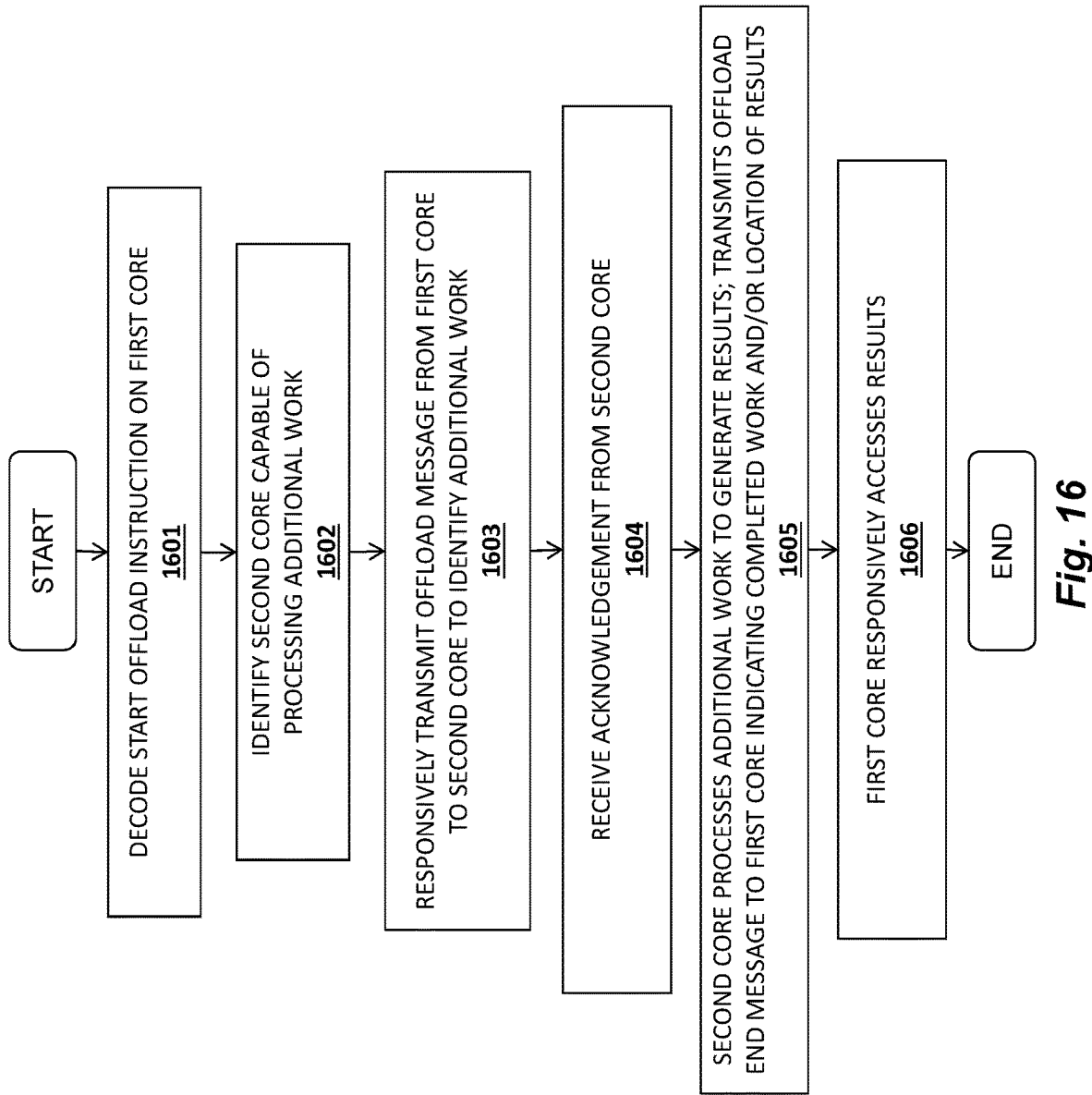
FIG. 16 illustrates one embodiment of a method for implementing a start offload instruction.

FIG. 16 illustrates one embodiment of a method for starting the offload operation. At 1601 the start offload instruction is decoded on the first core. As mentioned, the start offload instruction may identify one or more other cores (at 1602) to process the offloaded work (e.g., the second core) and/or a pointer or other identifier which the other cores can use to identify the work (e.g., an address pointer to a work descriptor or other structure in memory or cache). At 1603, the offload message is transmitted to the second core with this information. If the program code is highly parallel, the first core may transmit different work items to other cores via additional offload messages.

At 1604, the first core receives an acknowledgement from the second core (and potentially the additional cores) and at 1605 the second core (and the additional cores) process the additional work to generate results. Once complete, the second core (and optional additional cores) transmit an end offload message to the first core indicating that the work has been completed. As mentioned, in one embodiment, the end offload message is transmitted in response to execution of an end offload instruction and may include an indication of the location of the results (e.g., a pointer to a region in memory/cache or a register). At 1606, the first core responsively accesses the results.

One embodiment of the invention implements a specified sequence of operations in response to a fault condition to ensure that the fault or other exception is properly handled. While executing an instruction sequence, various types of fault conditions and other exceptions may be encountered including (but not limited to) general protection faults, stack faults, page faults, precision exceptions, underflow exceptions, divide by zero exceptions, denormalized operand exceptions, and invalid-operation exceptions. Processors often implement a specific fault handler or exception handler to resolve each of these fault conditions. While the discussion below will focus specifically on fault conditions, the underlying principles of the invention are applicable to any type of exception condition.

Figure 17:
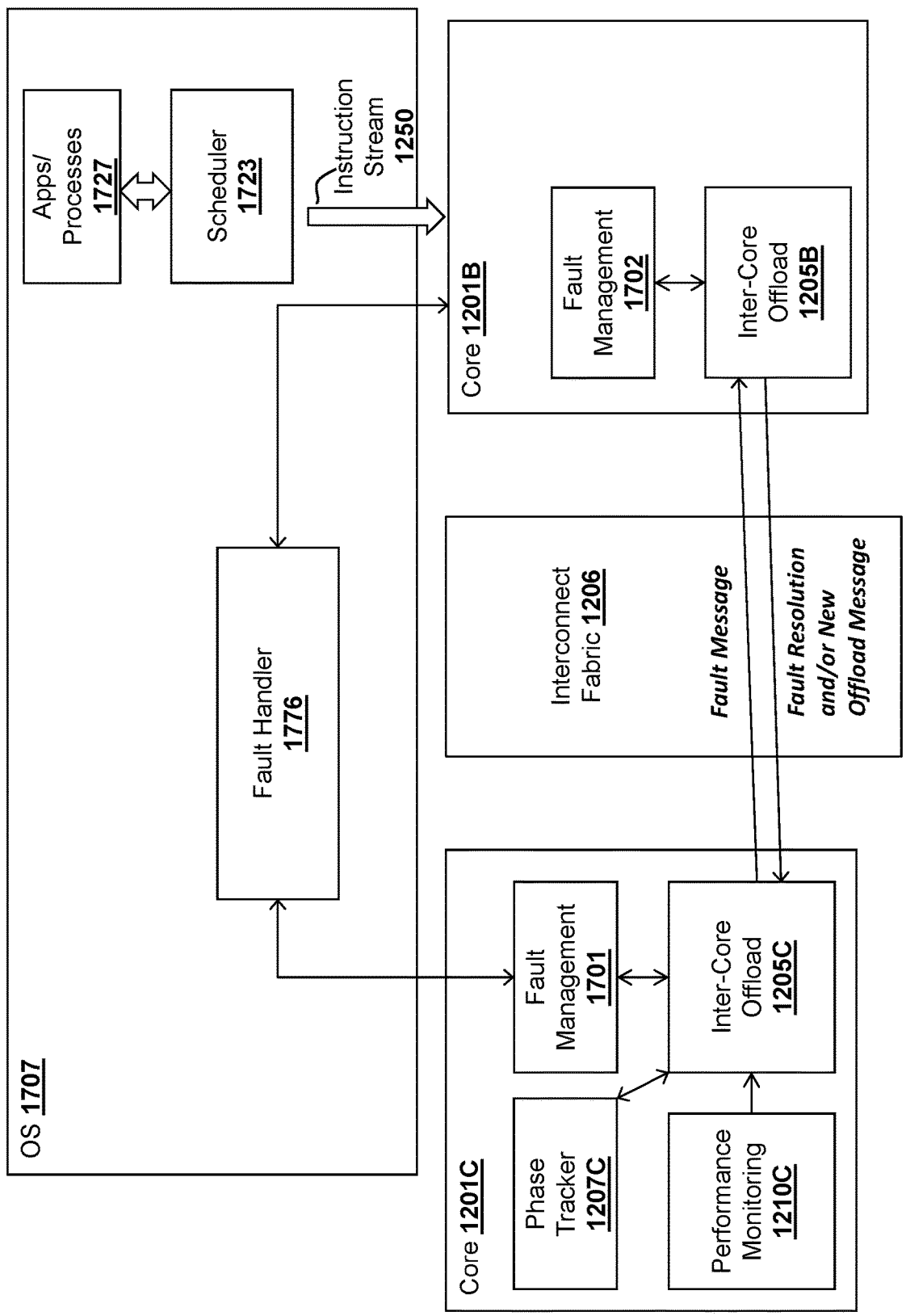
FIG. 17 illustrates one embodiment of the invention for handling fault conditions.

FIG. 17 illustrates an example embodiment with an operating system (OS) 1707 executing one or more apps/processes 1727 and a scheduler 1723 which schedules instructions 1250 for execution on the cores 1201A-C. In one implementation, if a fault occurs on a helper core 1201C while it is executing the offload work, the helper core provides control back to the parent core 1201B via a fault message. Prior to transmitting the fault message, fault management circuitry 1701 of the helper core may write one or more fault codes to a register and/or memory location indicating the reason for the fault condition (e.g., page fault, stack fault, etc). The inter-core offload circuitry 1205C of the helper core 1201C then transmits the fault message to the parent core 1201B with a pointer to the register/memory location. Alternatively, the fault condition may be stored in a known location (e.g., a designated fault register) which the parent core automatically reads upon receipt of the fault message. In one embodiment, upon processing the fault message, the inter-core offload circuitry 1205B update a fault register on the parent core 1201B which the parent core uses for fault processing (e.g., by executing a fault handler).

In one implementation, fault management circuitry 1702 of the parent core 1201B evaluates the fault condition and either attempts to resolve the fault or roll back the execution state to a point prior to the fault condition. If the fault is resolved (e.g., via a fault handler), the parent core 1201B may subsequently transmit a new offload message to the helper core 1201C to proceed with the offloaded work using the data resolving the fault (e.g., the correct translation). In some instances, the parent core 1201B may instruct the helper core 1201C to dump the prior work performed and/or may complete the work without the helper core.

In one implementation, certain types of faults (or all faults) are resolved directly on the helper core 1201C. For example, if the fault results from a lack of available information (e.g., a page translation fault), the helper core may attempt to determine that information (e.g., performing a page walk to determine the correct virtual-to-physical address translation). In response to a resolution of the fault, the helper core 1201C continues to process the offloaded work.

In one embodiment, a fault handler 1776 is executed to handle specific types of faults. For example, a different fault handler 1776 may be configured to manage each different each type of fault. For faults which must be resolved by the parent core 1201B, the parent core triggers the fault handler 1776 (e.g., by writing a register) while for faults which may be handled by the helper core 1201C, the helper core triggers the fault handler. In either case the fault handler 1776 may generate a result which resolves the fault (e.g., performing a page walk to determine a virtual-physical address translation) or, if the fault cannot be resolved, generates an indication that the fault is not resolvable. The parent core 1201B (and/or helper core 1201C) may then roll back to the prior execution state.

Figure 18:
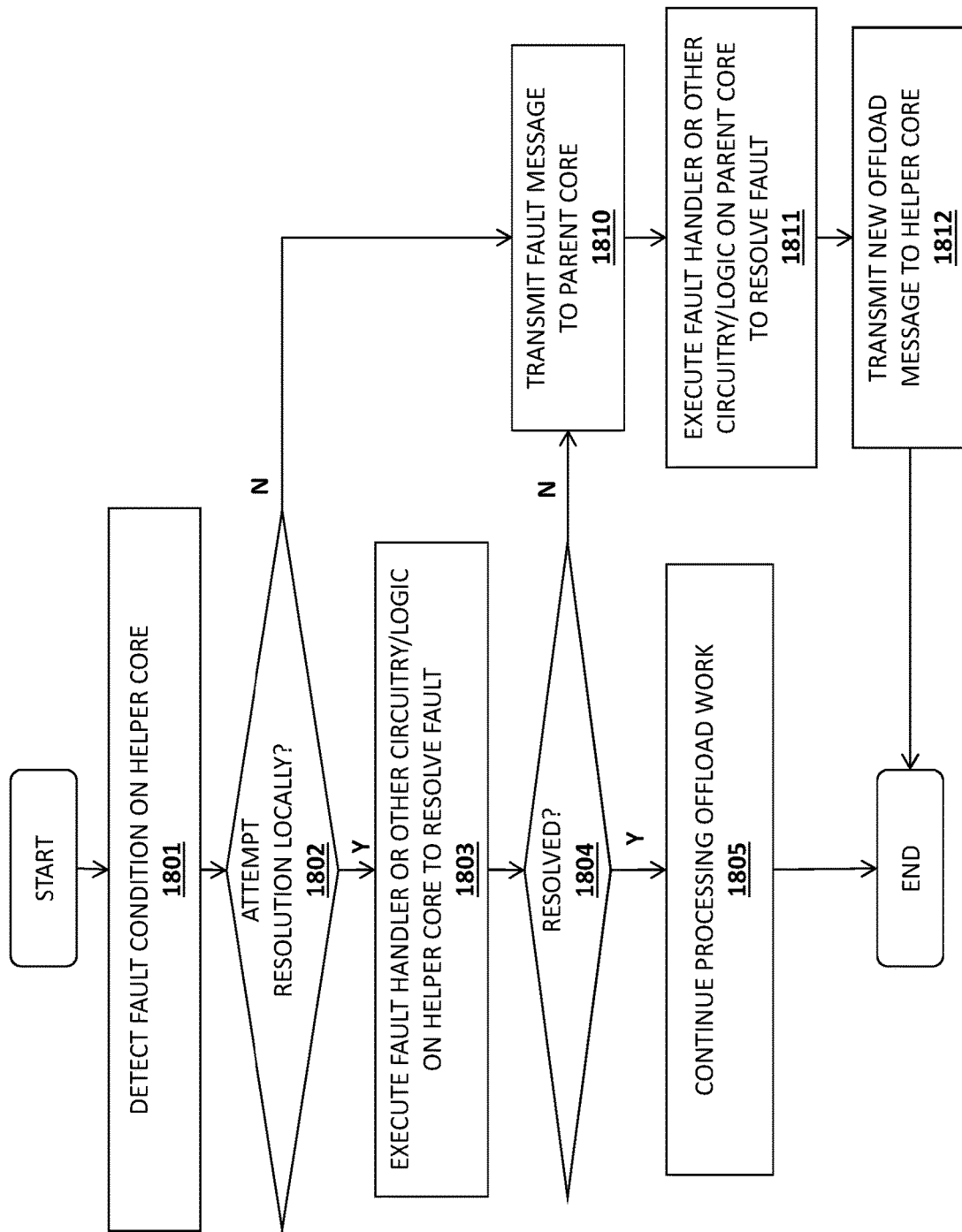
FIG. 18 illustrates a method for handling fault conditions in one embodiment of the invention.

A method for handling faults and other exceptions in a core-to-core offload environment is illustrated in FIG. 18. At

1801 a fault condition is detected on a helper core. If the fault is of a type which can be resolved locally, determined at 1802, then at 1803 the helper core executes a fault handler and/or accesses fault circuitry/logic to resolve the fault condition. If resolved at 1804, then at 1805 the core continues processing the offload work.

If the fault cannot be resolved or is not of a type capable of being resolved on the helper core, then at 1810 the helper core transmits a fault message to the parent core. As mentioned, the fault message may identify the fault and associated data (e.g., via a pointer to a fault register or directly in the body of the message). At 1811 the parent core executes a fault handler and/or accesses circuitry logic to resolve the fault. Once resolved, the parent core may transmit a new offload message to instruct the helper core to continue. Depending on the fault, this may require the helper core to roll back execution to a point prior to the fault condition.

One of the benefits of the implementations described herein is that the operating system is not required to have awareness of the core-to-core offload operations. From the perspective of the OS, parent core 1201B processes the instruction streams 1250 as scheduled by the OS scheduler and execution progress is maintained and reported to the OS solely from the parent core 1201B.

Figure 19:
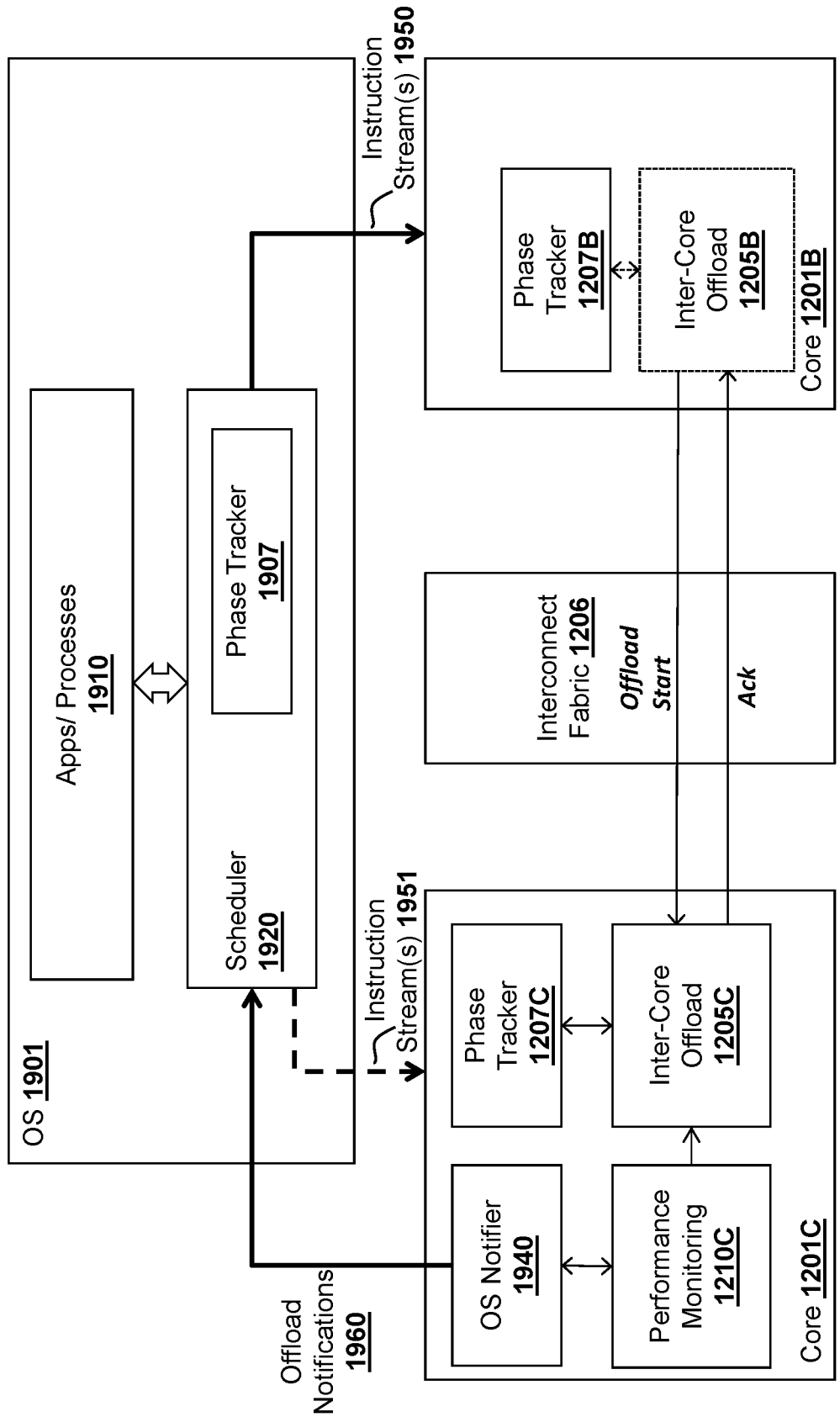
FIG. 19 illustrates one embodiment of an apparatus for notifying an operating system of offload work.

However, in certain embodiments, the OS may be provided with selective visibility to the offload operations described herein. FIG. 19 illustrates an embodiment in which an instruction stream 1950 is scheduled by a scheduler 1920 running as a component of an operating system (OS) 1901. In the illustrated example, parent core 1201B initiates an offload operation on helper core 1201C as in prior embodiments. In this implementation, however, an OS notifier 1940 on the helper core 1201C generates notifications 1960 to the OS 1901 to inform the OS of its current role as a helper core (i.e., that it is processing program code on behalf of parent core 1201B). The OS notifier may be implemented in circuitry, software, firmware, or any combination thereof. In response to the notification 1960, the scheduler 1920 may use this information to refrain from scheduling a new instruction stream 1951 on core 1901C, until it receives a notification 1960 that offload processing on the helper core 1201C is complete.

In an embodiment in which the OS 1901 is unaware of the offload operations, then the helper core 1201C may deny requests from the scheduler 1920 to process new instruction streams 1951. For example, the helper core 1201C may set a control register to indicate that it is busy or unavailable upon accepting the offload request made by the parent core 1201B or upon receiving the offload start message.

The helper core 1201C may still provide the OS 1901 the work that it has completed prior to receiving the offload work so that the OS can properly track the current execution state of the scheduled instruction streams 1951. If the work is incomplete, then the OS may migrate the remaining work to another core and/or the helper core 1201C may perform a rollback transaction to restore the execution state to a point prior to the offload work. If a portion of a loop is complete, it may send an indication of the remaining work back to the OS 1901 along with an indication of the slice of the overall loop to be restarted.

In one embodiment, the helper core 1201C may itself offload work to another helper core 1201A, becoming a parent core to the other helper core 1201A. This embodiment may be particularly useful in a heterogeneous computing architecture where core 1201A is configured to process the work offloaded from core 1201B more efficiently but cannot efficiently process the work accepted for offload by core 1201B. In this embodiment, for example, core 1201A may be a graphics processor core or DSP core capable of efficiently performing massively parallel operations in response to a single instruction or thread (e.g., such as in a single instruction multiple thread (SIMT) architecture). In such a case, each core 1201A-C may choose a particular helper core based on the type of work required (e.g., offloading highly parallel work or sequential work to those cores adapted for such work). Similarly, each helper core 1201A-C may accept or deny work based on the type of work being requested (e.g., only accepting work that it can perform efficiently). Of course, the underlying principles of the invention are not limited to a heterogeneous environment.

Figure 20:
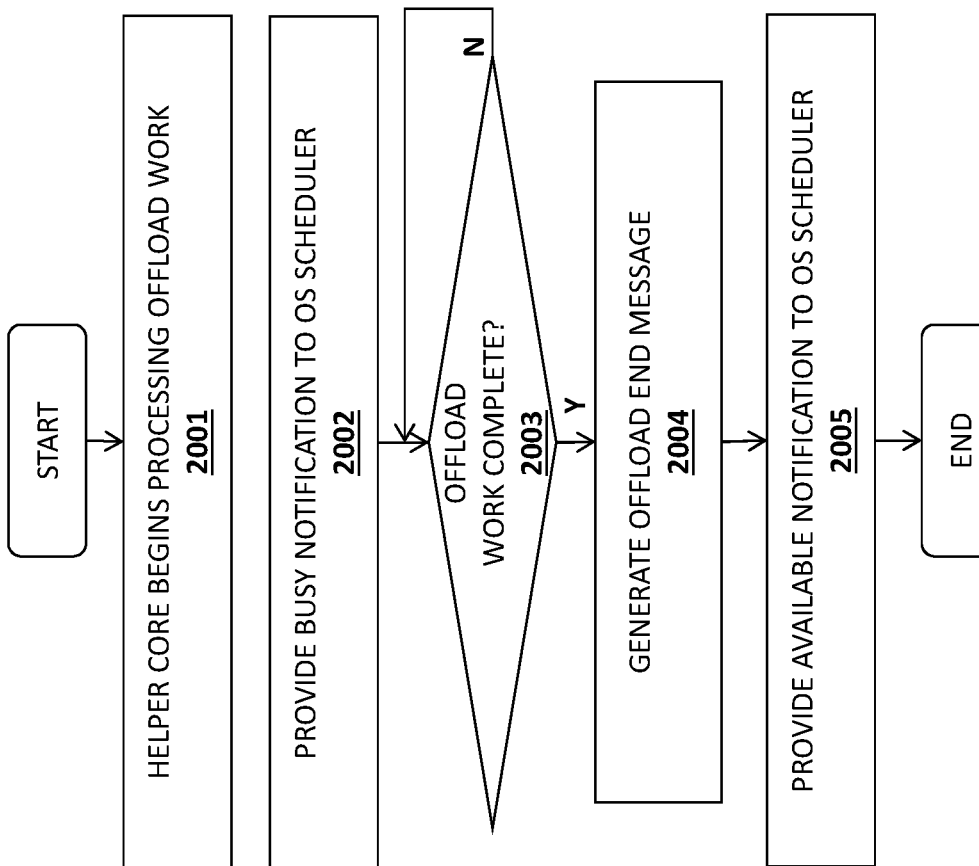
FIG. 20 illustrates a method for notifying an operating system in accordance with one embodiment of the invention.

A method in accordance with one embodiment of the invention is illustrated in FIG. 20. The method may be implemented in the context of the architectures described above but is not limited to any specific architecture.

At 2001, a helper core beings processing work which it has accepted from a parent core. At 2002, the helper core provides a busy notification to the OS scheduler. As mentioned, this may take the form of a bit or bit field in a register to indicate the helper core's unavailability. When the offload work is complete, determined at 2003, the helper core generates an offload end message (e.g., as previously described) at 2004 and, at 2005, provides an "available" notification to the OS scheduler. In one embodiment, for example, the bit or bitfield is updated to indicate to the OS that the core is no longer busy.

One embodiment of the invention performs modifications to addresses, control values, and other relevant context information when instructions are offloaded to a helper core. For example, conditional jump instructions will jump to an instruction sequence at a specified address based on one or more condition flag states and values used for comparisons. When these instructions are moved from a parent core to a helper core, the jump address may change.

As such, in one embodiment, the offload start instruction includes an address offset or a pointer to an address offset, which the helper core then uses to execute the conditional jump instruction (e.g., adding the offset to the original jump address). In addition, any conditional flag values and comparison values must be provided to the helper core. In one embodiment, the offload start instruction includes a state/ context operand identifying the context data required to execute the conditional jump instructions. For example, the context data may be stored in a memory region and may include all of the condition code values and comparison values needed to execute the instruction.

Figure 21:
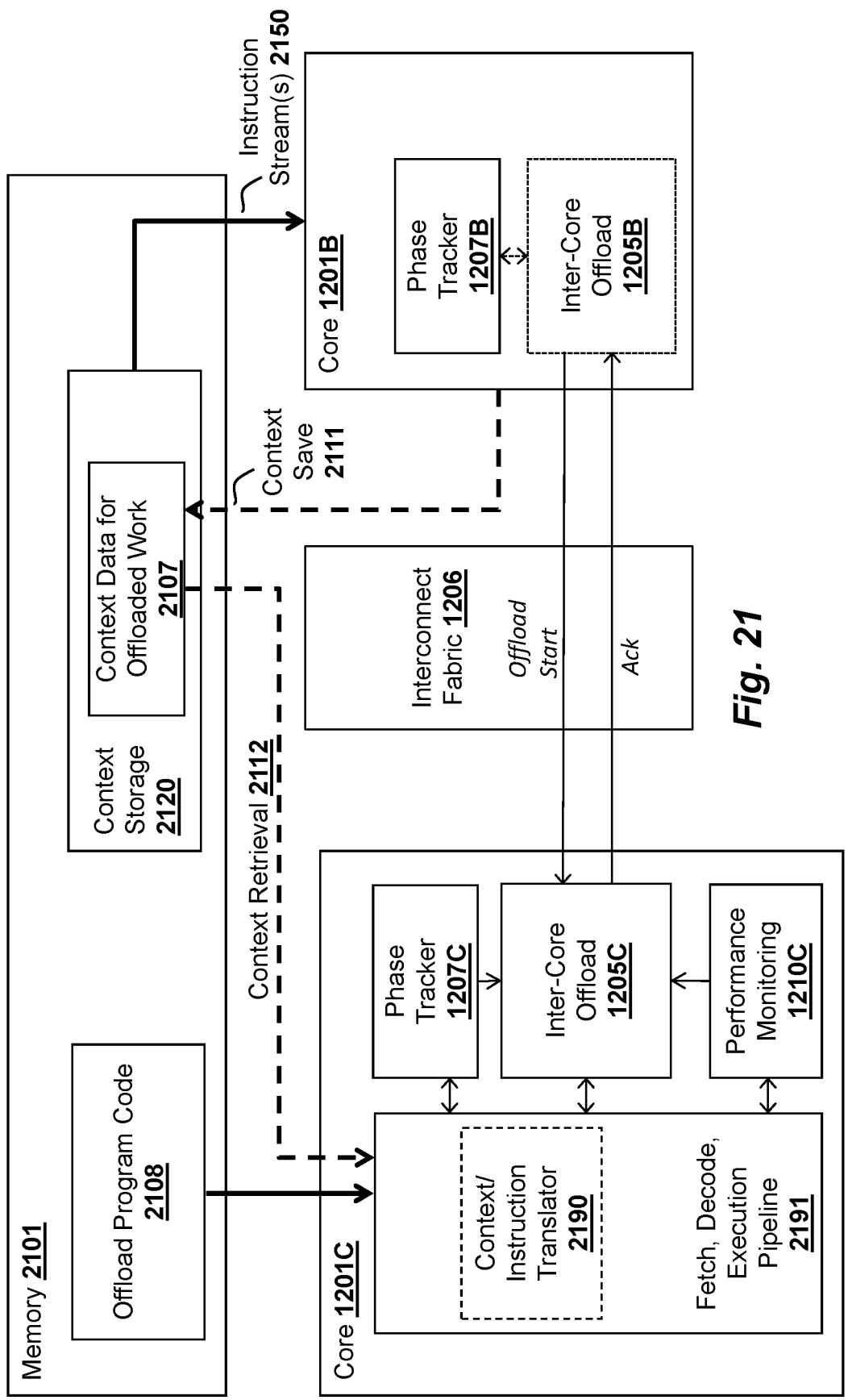
FIG. 21 illustrates one embodiment in which certain portions of program code or addresses are modified.

FIG. 21 illustrates these and other details for one embodiment of the invention. As core 1201B executes an instruction stream 2150 (or multiple streams), the execution context or state is continually updated. In one embodiment, the core 1201B performs a context save operation to save context data relevant to the work to be offloaded 2107 prior to transmitting the offload start message to core 1201C. As mentioned, the context may include data stored in vector or scalar registers, flag data stored in control registers, and any other data needed to complete execution of the offload work.

In the illustrated embodiment, the offload start message is processed by the inter-core offload circuitry 1205C of worker core 1201C to identify both the offload program code 2108 to be executed and the context data 2107 stored within a region of shared context storage 2120. For example, the offload start message may include a first pointer to the offload program code 2108 (i.e., the instruction pointer) and a second pointer to the context data 2107. The fetch, decode, and execution pipeline 2191 retrieves the context (2112) and fetches instructions from the offloaded program code 2108.

In one embodiment, a context/instruction translator 2190 performs any necessary modifications to the addresses and/or context required for processing by the fetch, decode, and execution pipeline 2191. For example, if a conditional jump instruction includes an address previously associated with core 1201B, then it may modify this address to point to a corresponding memory location for executing the conditional jump instruction on core 1201C (e.g., by adding an offset value). The context/instruction translator may be implemented within the instruction decoder 1338 (e.g., offload circuitry 1338A shown in FIG. 13) and/or the execution circuitry 1308 (e.g., offload circuitry 1308A shown in FIG. 13) to adjust program code (e.g., operands, opcodes), addresses, or data as needed so that the offloaded work can be performed without exceptions on the new core 1201B.

Figure 22:
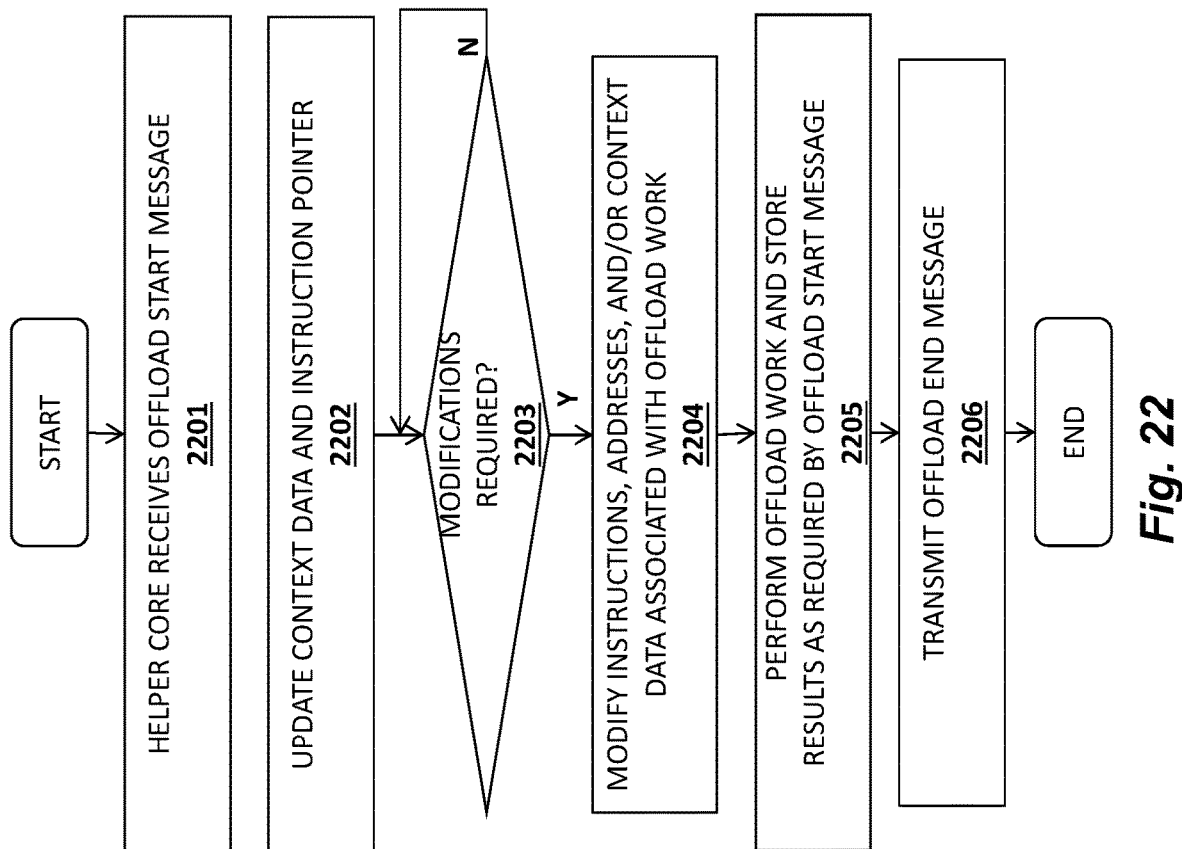
FIG. 22 illustrates a method for modifying instructions, address, or context data.

One embodiment of a method is illustrated in FIG. 22. The method may be implemented within the context of the system architectures described above but is not limited to any particular system architecture.

At 2201 a helper core receives an offload start message from a parent core. At 2202, based on the information in the offload start message, the helper core updates the context data and instruction pointer needed to perform the work. If modifications are required, determined at 2203, then the helper core performs the modifications at 2204. For example, addresses, instructions and/or the context data may need to be updated so that the instructions execute on the helper core without generating exceptions. At 2205, the helper core performs the offload work and stores the results as required by the offload start message. At 2206, the helper core transmits an offload end message to the parent core, which may then access the results from a designated memory location and/or registers.

As described above, one embodiment of the offload end instruction saves the results generated by the helper core and other relevant context data to a specific region in memory. The helper core then notifies the parent core that the work is complete. Moreover, in some embodiments described above, the offload end message transmitted from the helper core indicates the location where the results/context data are saved. Alternatively, as mentioned, the parent core may implicitly know where the work product of each core will be saved (e.g., the storage location may be predetermined during the system boot sequence or may be specified by the parent core in the offload start message).

Saving all of the state produced by the helper core may be unnecessary and wasteful of processor and memory resources if only a limited portion of it is needed by the parent core when offload processing is complete. As such, one embodiment of the invention includes a new context save instruction which saves selected components of the offload work state which the parent core will need to continue processing.

Figure 23:
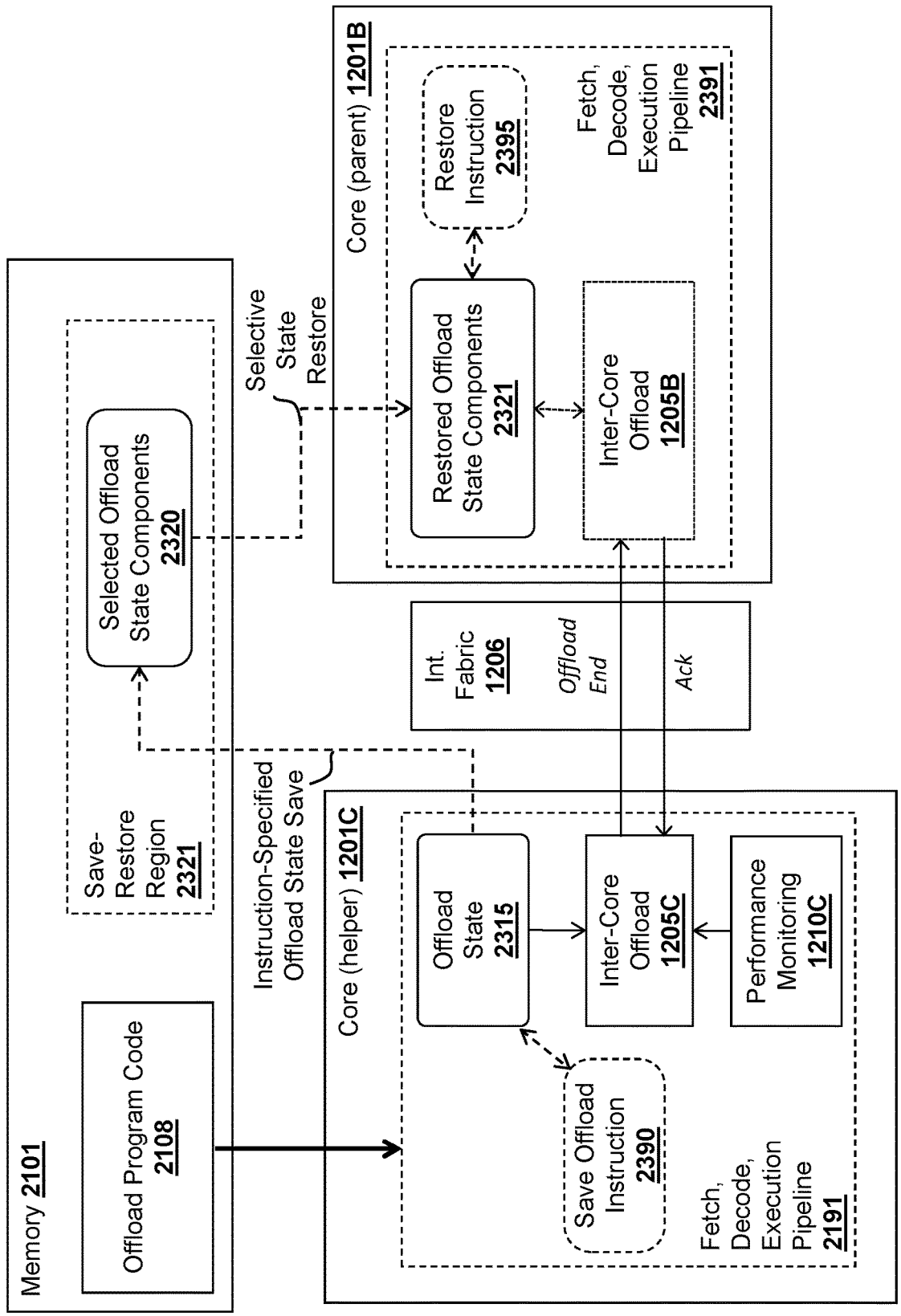
FIG. 23 illustrates one embodiment of an apparatus for saving and restoring state.

As illustrated in FIG. 23, a Save Offload Instruction 2390 is fetched, decoded, and executed by the fetch, decode, and execution pipeline 2191 of the helper core 1201C to implement the selective save operation. In one embodiment described below, the Save Offload Instruction 2390 comprises a new version of the x86 XSAVE instruction (hereinafter "XSAVEOFF") which identifies a limited portion of the state to be saved based on the bit values contained in an operand and/or register. However, the underlying principles of the invention are by no means limited to an x86 implementation.

In FIG. 23, the save-restore region 2321 comprises a designated region in memory for storing selected offload state components 2320 of the offload state 2315. In one embodiment, the offload state 2315 comprises all of the vector register data, scalar register data, control/status register data, flag data, and any other data modified while fetching, decoding, executing, and retiring the offload program code 2108. The selected offload state components 2320 are portions of the offload state data 2315 which are specifically identified by the Save Offload instruction. In one embodiment, these specific components are identified by a bitfield stored in a register or memory location and the save offload instruction 2390 identifies the bitfield from one or more operands. The bitfield may be stored in various different types of registers including, but not limited to, control/status registers, machine state registers, general purpose registers (GPRs), and vector registers (e.g., XMM, YMM, ZMM registers).

Alternatively, the Save Offload instruction may itself encode the bitfield in an immediate value or operand. However, such an implementation may require the state components to be identified at a coarser granularity, depending on the number of immediate/operand bits available for the bitfield.

Regardless of the specific manner in which the bitfield is encoded, in one embodiment, it identifies a specific subset of the offload state 2315 to be stored. For example, each individual bit of the bitfield may be set to 1 to identify a single state component corresponding to that bit which will be saved and set to 0 to indicate a single state component which will not be saved. For example, a first bit may indicate whether all SSE state should be saved, a second bit may indicate whether all AVX-512 state should be saved, and so on. In one embodiment, the bitmask is set based on whether the corresponding state values are modified and/or expected to be modified during execution of the offload work. For example, if it is known that the offload work will not modify any SSE state or any AVX-512 state then the bit values associated with these state components may be set to 0 (to indicate not to save).

In one embodiment, the bitfield may be set using a high granularity to identify the specific registers or sets of registers modified during the offload work. For example, if a relatively small offload only modifies one ZMM register, such as ZMM0, then the bitfield may be updated to indicate that only this data needs to be saved by the Save Offload instruction.

Alternatively, or in addition, the bitfield may identify the portions of the offload state 2315 which are NOT to be saved (e.g., each bit set to 1 may identify a component which is NOT to be saved to the save-restore region 2321). This implementation may be useful in configuration where most of the state information should be saved, but for a few specific components. In such a case, only these specific components need be identified by setting values in the bitfield. Any portion of the bitfield which has not been modified is associated with state to be saved.

Returning to the XSAVEOFF implementation, a set of existing XSAVE instructions save and restore the XSAVE-managed state components of a core. The XSAVE instruction set includes XSAVE, XSAVEOPT, XSAVEC, and XSAVES (for saving); and XRSTOR and XRSTORS (for restoring). The processor organizes the state components in a region of memory called the XSAVE area (e.g., save-restore region 2321). Each of the save and restore instructions takes a memory operand that specifies the 64-byte aligned base address of the XSAVE area on which it operates.

In one specific implementation, each XSAVE area has a format comprising a legacy region, an XSAVE header region, and an extended region. The legacy region of an XSAVE area comprises the 512 bytes starting at the area's base address. It is used to manage the state components for x87 state and SSE state. The XSAVE header of an XSAVE area comprises the 64 bytes starting at an offset of 512 bytes from the area's base address and the extended region starts at an offset of 576 bytes from the area's base address. It is used to manage the state components other than those for x87 state and SSE state. In existing x86 implementations, the size of the extended region is determined by which state components the processor supports and which bits have been set in XCR0 and IA32_XSS.

The XSAVEOFF instruction operates similarly as the XSAVE instruction, but also relies on a bitfield as described above to identify specific state components to save (or specific components to NOT save). Thus, by setting a bitfield in a register, operand, or other data structure, only those state components 2320 are saved, significantly reducing memory usage for offload work which only affects a small number of registers.

Different embodiments of the invention may rely on different bitfield encodings and different techniques for ensuring that the parent core is capable of restoring the saved state. As mentioned above, the address at which data is stored may be explicitly specified by the parent core or helper core. In the latter case, the helper core transmits the address to the parent core. In either case, the bitfield may specify state data which will NOT be saved or may specify state data which will be saved. Moreover, the bitfield may make its specifications at different levels of granularity including individual registers (e.g., specific ZMM registers), specific groups of registers (e.g., all control registers), or all state information.

Figure 24:
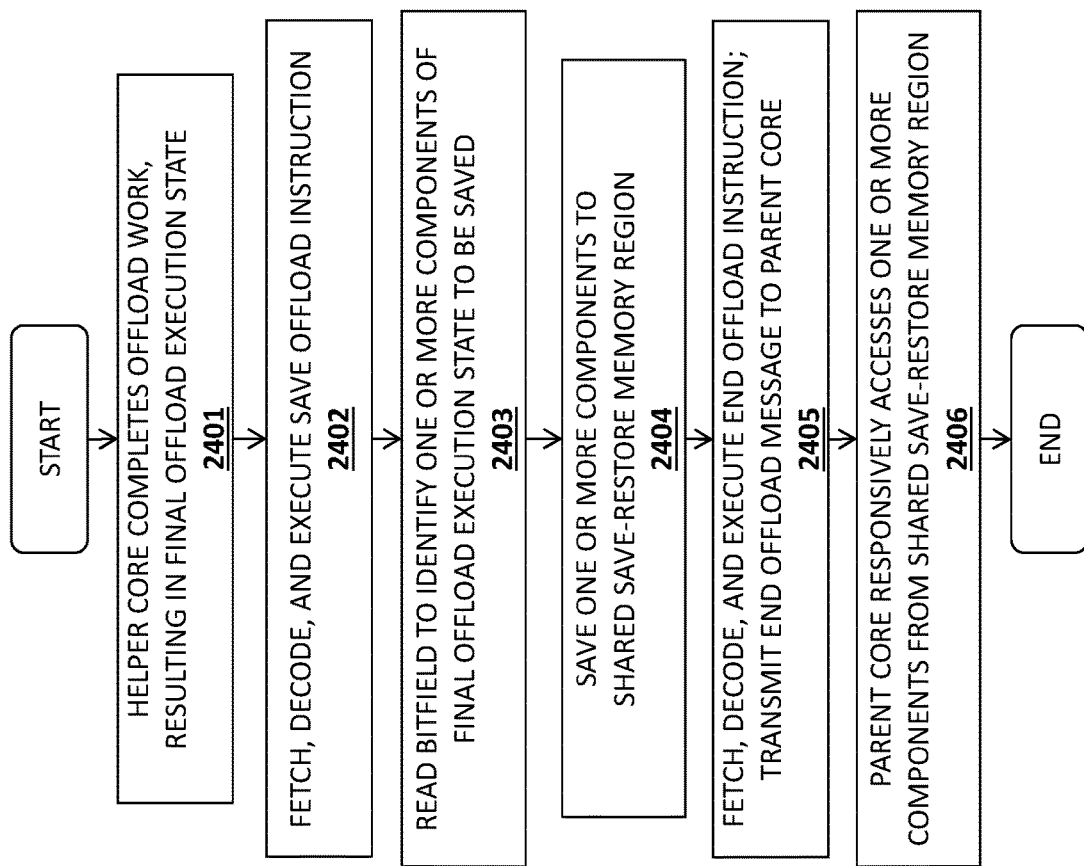
FIG. 24 illustrates a method for saving state in accordance with one embodiment of the invention.

A method in accordance with one embodiment of the invention is illustrated in FIG. 24. At 2401, a helper core completes offload work, resulting in a final offload execution state. At 2402, a save offload instruction is fetched, decoded, and executed. At 2403, a bitfield is read to identify one or more components of the final offload execution state to be saved.

At 2404 one or more components of the final offload execution state are saved to a designated save-restore memory region. At 2405, an end offload instruction is fetched, decoded, and executed to indicate an end of the offload. At 2406, the parent core responsively accesses the one or more components of the final offload execution state from a shared save-restore memory region.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Examples

The following are example implementations of different embodiments of the invention.

Example 1. A processor comprising: a plurality of cores; an interconnect coupling the plurality of cores; and offload circuitry to transfer work from a first core of the plurality of cores to a second core of the plurality of cores without operating system (OS) intervention, the work comprising a plurality of instructions; the second core comprising a translator to translate information associated with a first instruction of the plurality of instructions from a first format usable on the first core to a second format usable on the second core; fetch, decode, and execution circuitry of the second core to fetch, decode, and/or execute the first instruction using the second format.

Example 2. The processor of example 1 wherein the information comprises an address to be used when fetching, decoding, and/or executing the first instruction.

Example 3. The processor of example 2 wherein the first instruction comprises a Jump instruction.

Example 4. The processor of example 3 wherein the Jump instruction comprises a conditional jump with a first address to a jump code sequence when executed on the first core, wherein the translator is to translate the first address to a second address to identify the jump code sequence when executed on the second core.

Example 5. The processor of example 1 wherein the information comprises portions of context data required to execute the first instruction on the second core.

Example 6. The processor of example 1 wherein the offload circuitry is to transfer work from the first core to the second core by transmitting an offload start message comprising a first address pointer to identify a first memory location to be accessed by the second core to perform the offload work.

Example 7. The processor of example 6 wherein responsive to completing the offload work, the second core is to transmit an offload end message to the first core and to store results to memory.

Example 8. The processor of example 7 wherein the offload end message includes a second address pointer to identify a second memory location to be accessed by the first core to access the results.

Example 9. A method comprising: transferring work from a first core of the plurality of cores to a second core of the plurality of cores across an inter-core interconnect and without operating system (OS) intervention, the work comprising a plurality of instructions; the second core comprising a translator to translate information associated with a first instruction of the plurality of instructions from a first format usable on the first core to a second format usable on the second core; and fetching, decoding, and/or executing the first instruction using the second format.

Example 10. The method of example 9 wherein the information comprises an address to be used when fetching, decoding, and/or executing the first instruction.

Example 11. The method of example 9 wherein the first instruction comprises a Jump instruction.

Example 12. The method of example 9 wherein the Jump instruction comprises a conditional jump with a first address to a jump code sequence when executed on the first core, wherein the translator is to translate the first address to a second address to identify the jump code sequence when executed on the second core.

Example 13. The method of example 11 wherein the information comprises portions of context data required to execute the first instruction on the second core.

Example 14. The method of example 11 wherein the first core is to transfer work to the second core by transmitting an offload start message comprising a first address pointer to identify a first memory location to be accessed by the second core to perform the offload work.

Example 15. The method of example 14 wherein responsive to completing the offload work, the second core is to transmit an offload end message to the first core and to store results to memory.

Example 16. The method of example 15 wherein the offload end message includes a second address pointer to identify a second memory location to be accessed by the first core to access the results.

Example 17. A machine-readable medium having program code stored thereon which, when executed by a machine, causes the machine to perform the operations of: transferring work from a first core of the plurality of cores to a second core of the plurality of cores across an inter-core interconnect and without operating system (OS) intervention, the work comprising a plurality of instructions; the second core comprising a translator to translate information associated with a first instruction of the plurality of instructions from a first format usable on the first core to a second format usable on the second core; and fetching, decoding, and/or executing the first instruction using the second format.

Example 18. The machine-readable medium of example 17 wherein the information comprises an address to be used when fetching, decoding, and/or executing the first instruction.

Example 19. The machine-readable medium of example 17 wherein the first instruction comprises a Jump instruction.

Example 20. The machine-readable medium of example 19 wherein the Jump instruction comprises a conditional jump with a first address to a jump code sequence when executed on the first core, wherein the translator is to translate the first address to a second address to identify the jump code sequence when executed on the second core.

Example 21. The machine-readable medium of example 20 wherein the information comprises portions of context data required to execute the first instruction on the second core.

Example 22. The machine-readable medium of example 24 wherein the first core is to transfer work to the second core by transmitting an offload start message comprising a first address pointer to identify a first memory location to be accessed by the second core to perform the offload work.

Example 23. The machine-readable medium of example 22 wherein responsive to completing the offload work, the second core is to transmit an offload end message to the first core and to store results to memory.

Example 24. The machine-readable medium of example 23 wherein the offload end message includes a second address pointer to identify a second memory location to be accessed by the first core to access the results.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a plurality of cores;
an interconnect coupling the plurality of cores; and
offload circuitry to transfer work from a first core of the plurality of cores to a second core of the plurality of cores without operating system (OS) intervention, the work comprising a plurality of instructions, wherein the transfer comprises transmitting an offload start instruction to the second core, and wherein the offload start instruction is to identify an address to be accessed by the second core to perform the work;
the second core comprising a translator to translate information associated with a first instruction of the plurality of instructions from a first format usable on the first core to a second format usable on the second core, wherein the translator is to modify the address using an offset value to generate an updated address to be accessed by the second core;
fetch, decode, and execution circuitry of the second core to fetch, decode, and/or execute the first instruction using the second format.

2. The processor of claim 1 wherein the information comprises an address to be used when fetching, decoding, and/or executing the first instruction.

3. The processor of claim 1 wherein the first instruction comprises a Jump instruction.

4. The processor of claim 3 wherein the Jump instruction comprises a conditional jump with a first address to a jump code sequence when executed on the first core, wherein the translator is to translate the first address to a second address to identify the jump code sequence when executed on the second core.

5. The processor of claim 1 wherein the information comprises portions of context data required to execute the first instruction on the second core.

6. The processor of claim 1 wherein responsive to completing the offload work, the second core is to transmit an offload end message to the first core and to store results to memory.

7. The processor of claim 6 wherein the offload end message includes a second address pointer to identify a second memory location to be accessed by the first core to access the results.

8. A method comprising:
transferring work from a first core of a plurality of cores to a second core of the plurality of cores across an inter-core interconnect and without operating system (OS) intervention, the work comprising a plurality of instructions, wherein the transfer comprises transmitting an offload start instruction to the second core, and wherein the offload start instruction is to identify an address to be accessed by the second core to perform the work;
the second core comprising a translator to translate information associated with a first instruction of the plurality of instructions from a first format usable on the first core to a second format usable on the second core, wherein the translator is to modify the address using an offset value to generate an updated address to be accessed by the second core; and
fetching, decoding, and/or executing the first instruction using the second format.

9. The method of claim 8 wherein the information comprises an address to be used when fetching, decoding, and/or executing the first instruction.

10. The method of claim 8 wherein the first instruction comprises a Jump instruction.

11. The method of claim 10 wherein the Jump instruction comprises a conditional jump with a first address to a jump code sequence when executed on the first core, wherein the translator is to translate the first address to a second address to identify the jump code sequence when executed on the second core.

12. The method of claim 10 wherein the information comprises portions of context data required to execute the first instruction on the second core.

13. The method of claim 8 wherein responsive to completing the offload work, the second core is to transmit an offload end message to the first core and to store results to memory.

14. The method of claim 13 wherein the offload end message includes a second address pointer to identify a second memory location to be accessed by the first core to access the results.

15. A non-transitory machine-readable medium having program code stored thereon which, when executed by a machine, causes the machine to perform the operations of:
transferring work from a first core of a plurality of cores to a second core of the plurality of cores across an inter-core interconnect and without operating system (OS) intervention, the work comprising a plurality of instructions, wherein the transfer comprises transmitting an offload start instruction to the second core, and wherein the offload start instruction is to identify an address to be accessed by the second core to perform the work;
the second core comprising a translator to translate information associated with a first instruction of the plurality of instructions from a first format usable on the first core to a second format usable on the second core, wherein the translator is to modify the address using an offset value to generate an updated address to be accessed by the second core; and
fetching, decoding, and/or executing the first instruction using the second format.

16. The non-transitory machine-readable medium of claim 15 wherein the information comprises an address to be used when fetching, decoding, and/or executing the first instruction.

17. The non-transitory machine-readable medium of claim 15 wherein the first instruction comprises a Jump instruction.

18. The non-transitory machine-readable medium of claim 17 wherein the Jump instruction comprises a conditional jump with a first address to a jump code sequence when executed on the first core, wherein the translator is to translate the first address to a second address to identify the jump code sequence when executed on the second core.

19. The non-transitory machine-readable medium of claim 18 wherein the information comprises portions of context data required to execute the first instruction on the second core.

20. The non-transitory machine-readable medium of claim 15 wherein responsive to completing the offload work, the second core is to transmit an offload end message to the first core and to store results to memory.

21. The non-transitory machine-readable medium of claim 20 wherein the offload end message includes a second address pointer to identify a second memory location to be accessed by the first core to access the results.

* * * * *